(12) United States Patent
Sleiman et al.

(10) Patent No.: US 7,520,728 B2
(45) Date of Patent: Apr. 21, 2009

(54) HP TURBINE VANE AIRFOIL PROFILE

(75) Inventors: Mohamad Sleiman, St. Laurent (CA);
Edward Vlasic, Beaconsfield (CA);
Sami Girgis, Montréal (CA)

(73) Assignee: Pratt & Whitney Canada Corp.,
Longueuil, Quebec (CA)

( * ) Notice: Subject to any disclaimer, the term of this patent is extended or adjusted under 35 U.S.C. 154(b) by 411 days.

(21) Appl. No.: 11/516,601

(22) Filed: Sep. 7, 2006

(65) Prior Publication Data
US 2008/0273970 A1    Nov. 6, 2008

(51) Int. Cl.
*B64C 27/46* (2006.01)
(52) U.S. Cl. .............................. 416/223 R; 416/223 A; 416/246
(58) Field of Classification Search .............. 416/223 R, 416/243
See application file for complete search history.

(56) References Cited

U.S. PATENT DOCUMENTS

| | | | |
|---|---|---|---|
| 6,398,489 B1 | 6/2002 | Burdgick et al. | |
| 6,832,897 B2 | 12/2004 | Urban | |
| 6,854,961 B2 | 2/2005 | Zhang et al. | |
| 6,910,868 B2 | 6/2005 | Hyde et al. | |
| 7,354,249 B2* | 4/2008 | Girgis et al. | 416/223 A |
| 2005/0079061 A1 | 4/2005 | Beddard et al. | |
| 2008/0044287 A1* | 2/2008 | Girgis et al. | |
| 2008/0056896 A1* | 3/2008 | Trindale et al. | 415/208.1 |

OTHER PUBLICATIONS

U.S. Appl. No. 11/366,018, filed Mar. 2, 2006, Girgis et al.
U.S. Appl. No. 11/366,025, filed Mar. 2, 2006, Girgis et al.
U.S. Appl. No. 11/366,020, filed Mar. 2, 2006, Girgis et al.
U.S. Appl. No. 11/366,015, filed Mar. 2, 2006, Girgis et al.
U.S. Appl. No. 11/366,026, filed Mar. 2, 2006, Girgis et al.

* cited by examiner

*Primary Examiner*—Edward Look
*Assistant Examiner*—Aaron R Eastman
(74) *Attorney, Agent, or Firm*—Ogilvy Renault LLP

(57) ABSTRACT

A two-stage high pressure turbine comprises a second stage vane having an airfoil with a profile substantially in accordance with at least an intermediate portion of the Cartesian coordinate values of X, Y and Z set forth in Table 2. The X and Y values are distances, which when smoothly connected by an appropriate continuing curve, define airfoil profile sections at each distance Z. The profile sections at each distance Z are joined smoothly to one another to form a complete airfoil shape.

15 Claims, 3 Drawing Sheets

HP TURBINE VANE AIRFOIL PROFILE

TECHNICAL FIELD

The invention relates generally to a vane airfoil for a gas turbine engine and, more particularly, to an airfoil profile suited for use in the second stage vane assembly of a two-stage high pressure turbine.

BACKGROUND OF THE ART

Every stage of a gas turbine engine must meet a plurality of design criteria to assure the best possible overall engine efficiency. The design goals dictate specific thermal and mechanical requirements that must be met pertaining to heat loading, parts life and manufacturing, use of combustion gases, throat area, vectoring, the interaction between stages to name a few. The design criteria for each stage is constantly being re-evaluated and improved upon. Each airfoil is subject to flow regimes which lend themselves easily to flow separation, which tend to limit the amount of work transferred to the compressor, and hence the total thrust or power capability of the engine. The high pressure turbine is also subject to harsh temperatures and pressures, which require a solid balance between aerodynamic and structural optimization. Therefore, improvements in airfoil design are sought.

SUMMARY OF THE INVENTION

It is an object of this invention to provide an improved vane airfoil suited for use in a two-stage high pressure turbine vane assembly.

The present invention minimizes static pressure gradients in the spanwise and pitch-wise directions, to minimize secondary losses and to beneficially align the flow entering the downstream HP blade stage. The airfoil sectional throat distributions are optimized for ideal exit radial swirl and total pressure gradients for optimum work on the downstream high pressure turbine blades. The design also provides for optimized outer diameter gaspath and vane tip section to optimize surface Mach number distribution in flared gaspath.

In one aspect, the present invention provides a turbine vane for a gas turbine engine comprising an airfoil having an intermediate portion defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z In another aspect, the present invention provides a turbine vane for a gas turbine engine, the turbine vane having an uncoated intermediate airfoil portion defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z, and wherein the X and Y values are scalable as a function of the same constant or number.

In another aspect, the present invention provides a turbine stator assembly for a gas turbine engine comprising a plurality of vanes, each vanes including an airfoil having an intermediate portion defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z.

In accordance with a still further general aspect of the present invention, there is provided a high pressure turbine vane comprising at least one airfoil having a surface lying substantially on the points of Table 2, the airfoil extending between platforms defined generally by Table 1, wherein a fillet radius is applied around the airfoil between the airfoil and platforms, and wherein the values of Table 2 are subject to the relevant tolerance.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
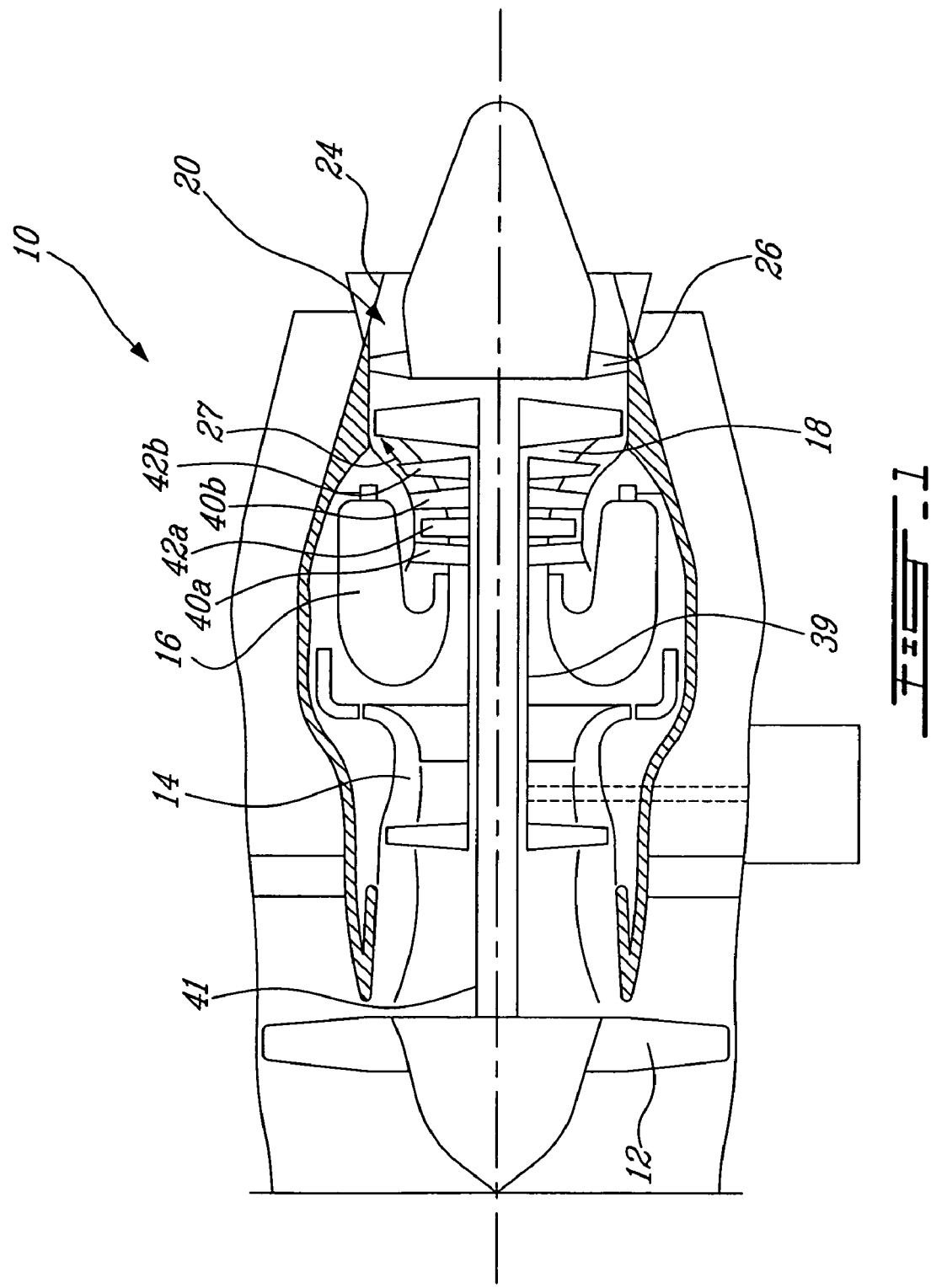
FIG. 1 is a schematic view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases to drive the fan, the compressor, and produce thrust.

The gas turbine engine 10 further includes a turbine exhaust duct 20 which is exemplified as including an annular core portion 22 and an annular outer portion 24 and a plurality of struts 26 circumferentially spaced apart, and radially extending between the inner and outer portions 22, 24.

Figure 2:
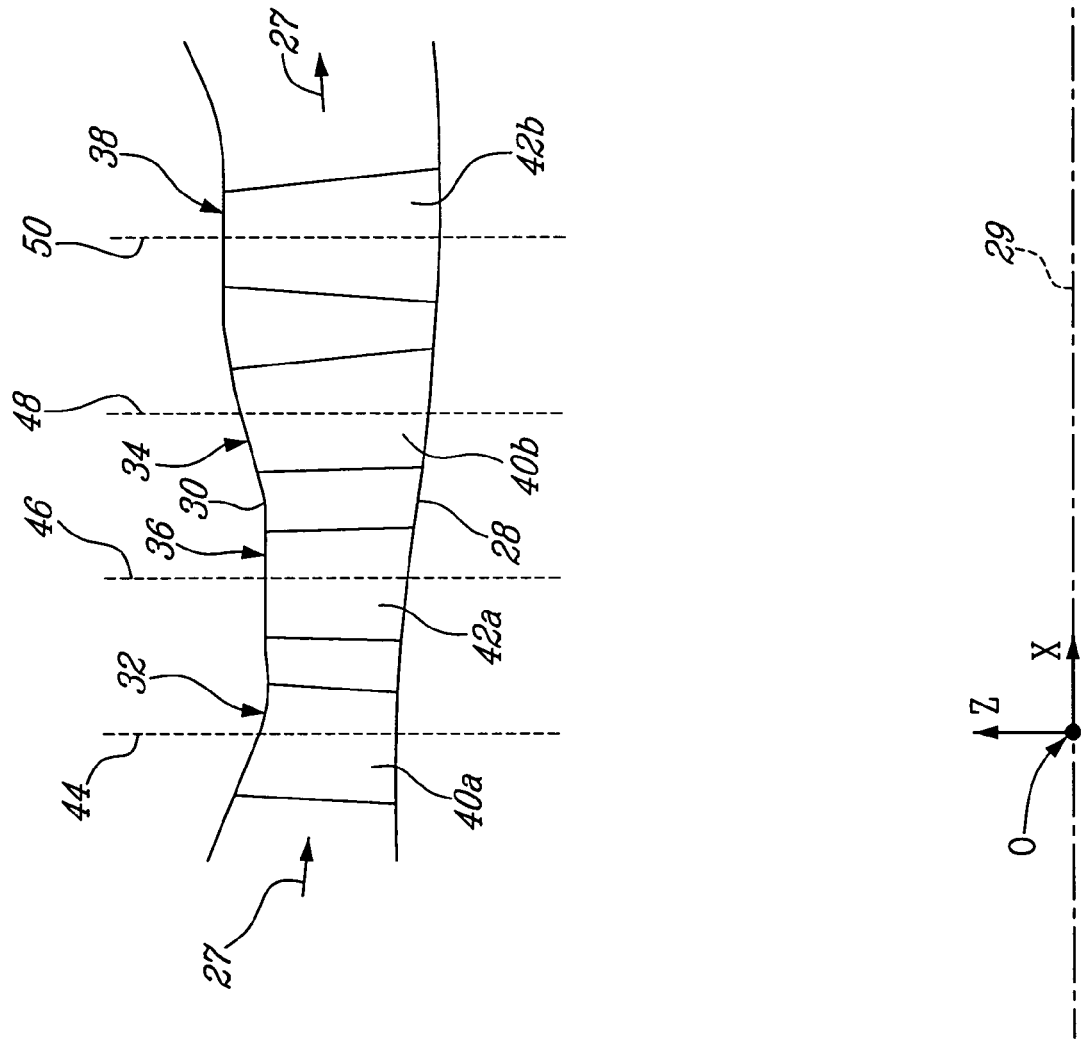
FIG. 2 is a schematic view of a gaspath of the gas turbine engine of FIG. 1, including a two-stage high pressure turbine.

FIG. 2 illustrates a portion of an annular hot gaspath, indicated by arrows 27 and defined by annular inner and outer walls 28 and 30 respectively, for directing the stream of hot combustion gases axially in an annular flow. The profile of the inner and outer walls 28 and 30 of the annular gaspath, "cold" (i.e. non-operating) conditions, is defined by the Cartesian coordinate values given in Table 1 below. More particularly, the inner and outer gaspath walls 28 and 30 are defined with respect to mutually orthogonal x and z axes, as shown in FIG. 2. The x axis corresponds to the engine turbine rotor centerline 29. The radial distance of the inner and outer walls 28 and 30 from the engine turbine rotor centerline and, thus, from the x-axis at specific axial locations is measured along the z axis. The z values provide the inner and outer radius of the gas path at various axial locations therealong. The x and z coordinate values in Table 1 are distances given in inches from the point of origin O (see FIG. 2). It is understood that other units of dimensions may be used. The x and z values have in average a manufacturing tolerance of about ±0.010". It is understood that the manufacturing tolerances of the gas path vary along the axial length thereof.

The turbine section 18 has two high pressure turbine (HPT) stages located in the gaspath 27 downstream of the combustor 16. Referring to FIG. 2, the HPT stages are preferably transonic and each comprises a stator assembly 32, 34 and a rotor assembly 36, 38 having a plurality of circumferentially arranged vane 40a, 40b and blades 42a, 42b respectively. The vanes 40a, b and blades 42a, b are mounted in position along respective stacking lines 44-50, as identified in FIG. 2. The stacking lines 44-50 extend in the radial direction along the z axis at different axial locations. The stacking lines 44-50 define the axial location where the blades and vanes of each stage are mounted in the engine 10. More specifically, stacking line 44 located at x=0 corresponds to the first stage HPT vane 40a, referred to as VANE 1 in Table 1. Stacking line 46 located at x=1.24 corresponds to the first stage HPT blade 42a, referred to as BLADE 1 in Table 1. Stacking line 48 located at x=2.56 corresponds to the second stage HPT vane 40b, referred to as VANE 2 in Table 1. Stacking line 50 located at x=3.98 corresponds to the HPT blade 42b, referred to as BLADE 2 in Table 1.

TABLE 1

COLD GASPATH DEFINITION

| INNER GASPATH | | | OUTER GASPATH | |
|---|---|---|---|---|
| X | Z | | X | Z |
| −0.6 | 5.975 | | −0.6 | 7.129 |
| −0.385 | 5.975 | | −0.385 | 7.055 |
| 0 | 5.975 | VANE 1 | 0 | 6.922 |
| 0.127 | 5.975 | | 0.127 | 6.883 |
| 0.281 | 5.974 | | 0.281 | 6.856 |
| 0.468 | 5.961 | | 0.468 | 6.847 |
| 0.699 | 5.94 | | 0.699 | 6.901 |
| 1.076 | 5.904 | | 1.076 | 6.901 |
| 1.24 | 5.888 | BLADE 1 | 1.24 | 6.901 |
| 1.656 | 5.837 | | 1.656 | 6.901 |
| 1.871 | 5.814 | | 1.871 | 6.93 |
| 2.301 | 5.788 | | 2.301 | 7.015 |
| 2.56 | 5.784 | VANE 2 | 2.56 | 7.08 |
| 2.768 | 5.771 | | 2.768 | 7.128 |
| 3.15 | 5.757 | | 3.15 | 7.17 |
| 3.25 | 5.75 | | 3.25 | 7.201 |
| 3.446 | 5.737 | | 3.446 | 7.201 |
| 3.73 | 5.672 | | 3.73 | 7.201 |
| 3.98 | 5.763 | BLADE 2 | 3.98 | 7.201 |
| 4.225 | 5.673 | | 4.225 | 7.201 |
| 4.461 | 5.673 | | 4.461 | 7.201 |
| 4.717 | 5.676 | | 4.717 | 7.222 |
| 5 | 5.688 | | 5 | 7.281 |
| 5.444 | 5.721 | | 5.444 | 7.433 |

Figure 3:
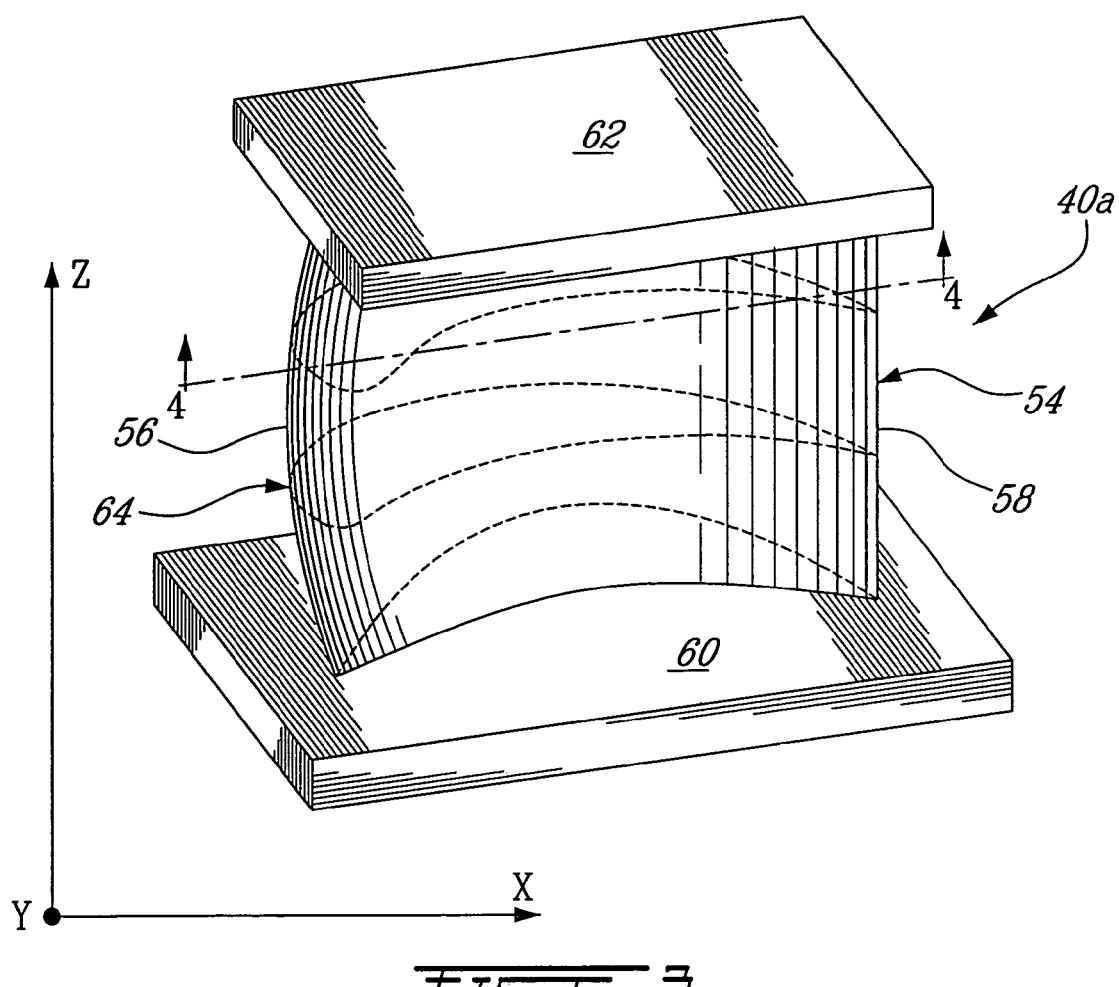
FIG. 3 is a schematic elevation view of a second stage HPT vane having a vane profile defined in accordance with an embodiment of the present invention.
Figure 4:
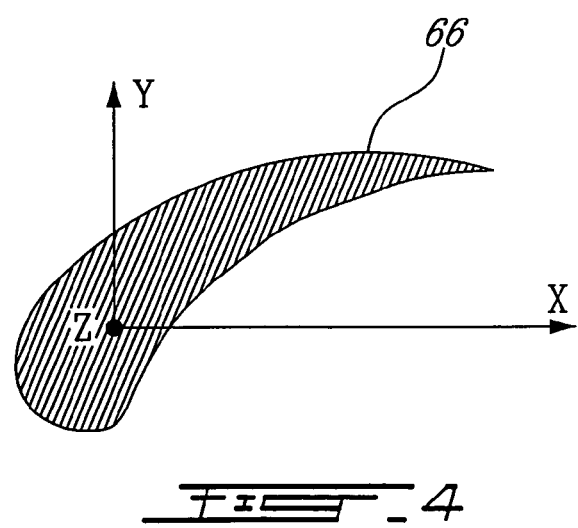
FIG. 4 is a cross sectional view taken along lines 4-4 of FIG. 3, showing a representative profile section of the airfoil portion of the vane.

More specifically, the stator assemblies 32, 34 each include the plurality of circumferentially distributed vanes 40a and 40b respectively which extend radially across the hot gaspath 27. The second HPT stator assembly 34 comprises ?? vanes 40b that are uniformly circumferentially distributed 48. FIG. 3 shows an example of a vane 40b of the second HPT stage. It can be seen that each vane 40b has an airfoil 54 having a leading edge 56 and a trailing edge 58, extending between inner vane platform 60 and outer vane platform 62. The first HPT stage includes 32 HP vanes and 44 HP blades, the second HPT stage include 48 HP vanes and 46 HP blades.

The novel airfoil shape of each second stage HPT vane 40b is defined by a set of X-Y-Z points in space. This set of points represents a novel and unique solution to the target design criteria discussed above, and are well-adapted for use in a two-stage HPT design. The set of points are defined in a Cartesian coordinate system which has mutually orthogonal X, Y and Z axes. The X axis extends axially along the turbine rotor centerline 29, i.e., the rotary axis. The positive X direction is axially towards the aft of the turbine engine 10. The Z axis extends along the HPT vane stacking line 44 of each respective vane 40a in a generally radial direction and intersects the X axis. The positive Z direction is radially outwardly toward the outer vane platform 62. The Y axis extends tangentially with the positive Y direction being in the direction of rotation of the rotor assembly 36. Therefore, the origin of the X, Y and Z axes is defined at the point of intersection of all three orthogonally-related axes: that is the point (0,0,0) at the intersection of the center of rotation of the turbine engine 10 and the stacking line 44.

In a particular embodiment of the two-stage high pressure turbine, the set of points which define the second HPT stage vane airfoil profile relative to the axis of rotation of the turbine engine 10 and stacking line 44 thereof are set out in Table 2 below as X, Y and Z Cartesian coordinate values. Particularly, the vane airfoil profile is defined by profile sections 66 at various locations along its height, the locations represented by Z values. It should be understood that the Z values do not represent an actual radial height along the airfoil 54 but are defined with respect to the engine center line. For example, if the vanes 40a are mounted about the stator assembly 32 at an angle with respect to the radial direction, then the Z values are not a true representation of the height of the airfoils of the vanes 40a. Furthermore, it is to be appreciated that, with respect to Table 2, Z values are not actually radial heights, per se, from the centerline but rather a height from a plane through the centerline—i.e. the sections in Table 2 are planar. The coordinate values are set forth in inches in Table 2 although other units of dimensions may be used when the values are appropriately converted.

Thus, at each Z distance, the X and Y coordinate values of the desired profile section 66 are defined at selected locations in a Z direction normal to the X, Y plane. The X and Y coordinates are given in distance dimensions, e.g., units of inches, and are joined smoothly, using appropriate curve-fitting techniques, at each Z location to form a smooth continuous airfoil cross-section. The vane airfoil profiles of the various surface locations between the distances Z are determined by smoothly connecting the adjacent profile sections 66 to one another to form the airfoil profile.

The coordinate values listed in Table 2 below represent the desired airfoil profiles in a "cold" (i.e. non-operating) condition. However, the manufactured airfoil surface profile, will be slightly different, as a result of manufacturing and applied coating tolerances. The coordinate values listed in Table 2 below are for an uncoated airfoil. According to an embodiment of the present invention, the finished HPT vane is coated with a thermal protecting layer.

The Table 2 values are generated and shown to three decimal places for determining the profile of the second HPT stage vane airfoil. However, as mentioned above, there are manufacturing tolerance issues to be addressed and, accordingly, the values for the profile given in Table 2 are for a theoretical airfoil, to which a ±0.003 inches manufacturing tolerance is additive to the X and Y values given in Table 2 below. Furthermore a 0.001-0.002 inch thickness of coating is typically applied to the HPT vane defined in Table 2. The HPT stage vane airfoil design functions well within these ranges of variation. The cold or room temperature profile is given by the X, Y and Z coordinates for manufacturing purposes. It is understood that the airfoil may deform, within acceptable limits, once entering service.

The coordinate values given in Table 2 below provide the preferred nominal HPT stage vane airfoil profile.

TABLE 2

|  | X | Y | Z |
|---|---|---|---|
| SECTION 1 | −0.423 | −0.122 | 5.604 |
|  | −0.423 | −0.125 | 5.604 |
|  | −0.422 | −0.128 | 5.604 |
|  | −0.421 | −0.132 | 5.604 |
|  | −0.421 | −0.135 | 5.604 |
|  | −0.420 | −0.138 | 5.604 |
|  | −0.419 | −0.141 | 5.604 |
|  | −0.418 | −0.144 | 5.604 |
|  | −0.417 | −0.148 | 5.604 |
|  | −0.416 | −0.151 | 5.604 |
|  | −0.415 | −0.154 | 5.604 |
|  | −0.409 | −0.169 | 5.604 |
|  | −0.402 | −0.184 | 5.604 |
|  | −0.393 | −0.198 | 5.604 |
|  | −0.382 | −0.210 | 5.604 |
|  | −0.371 | −0.222 | 5.604 |
|  | −0.358 | −0.233 | 5.604 |
|  | −0.345 | −0.242 | 5.604 |
|  | −0.331 | −0.251 | 5.604 |
|  | −0.316 | −0.258 | 5.604 |
|  | −0.301 | −0.264 | 5.604 |
|  | −0.285 | −0.268 | 5.604 |
|  | −0.269 | −0.272 | 5.604 |
|  | −0.252 | −0.274 | 5.604 |
|  | −0.236 | −0.275 | 5.604 |
|  | −0.219 | −0.275 | 5.604 |
|  | −0.203 | −0.273 | 5.604 |
|  | −0.187 | −0.271 | 5.604 |
|  | −0.170 | −0.268 | 5.604 |
|  | −0.154 | −0.264 | 5.604 |
|  | −0.139 | −0.259 | 5.604 |
|  | −0.123 | −0.254 | 5.604 |
|  | −0.108 | −0.248 | 5.604 |
|  | −0.093 | −0.241 | 5.604 |
|  | −0.078 | −0.234 | 5.604 |
|  | −0.064 | −0.226 | 5.604 |
|  | −0.049 | −0.218 | 5.604 |
|  | −0.035 | −0.209 | 5.604 |
|  | −0.022 | −0.200 | 5.604 |
|  | −0.008 | −0.190 | 5.604 |
|  | 0.005 | −0.181 | 5.604 |
|  | 0.018 | −0.171 | 5.604 |
|  | 0.031 | −0.160 | 5.604 |
|  | 0.044 | −0.150 | 5.604 |
|  | 0.056 | −0.139 | 5.604 |
|  | 0.068 | −0.128 | 5.604 |
|  | 0.080 | −0.117 | 5.604 |
|  | 0.092 | −0.105 | 5.604 |
|  | 0.104 | −0.094 | 5.604 |
|  | 0.116 | −0.082 | 5.604 |
|  | 0.127 | −0.070 | 5.604 |
|  | 0.139 | −0.058 | 5.604 |
|  | 0.150 | −0.046 | 5.604 |
|  | 0.161 | −0.034 | 5.604 |
|  | 0.172 | −0.022 | 5.604 |
|  | 0.183 | −0.010 | 5.604 |
|  | 0.193 | 0.003 | 5.604 |
|  | 0.204 | 0.015 | 5.604 |
|  | 0.215 | 0.028 | 5.604 |
|  | 0.225 | 0.041 | 5.604 |
|  | 0.235 | 0.054 | 5.604 |
|  | 0.246 | 0.067 | 5.604 |
|  | 0.256 | 0.080 | 5.604 |
|  | 0.266 | 0.093 | 5.604 |
|  | 0.275 | 0.106 | 5.604 |
|  | 0.285 | 0.119 | 5.604 |
|  | 0.295 | 0.133 | 5.604 |
|  | 0.304 | 0.146 | 5.604 |
|  | 0.314 | 0.160 | 5.604 |
|  | 0.323 | 0.173 | 5.604 |

TABLE 2-continued

| X | Y | Z |
|---|---|---|
| 0.332 | 0.187 | 5.604 |
| 0.341 | 0.201 | 5.604 |
| 0.350 | 0.214 | 5.604 |
| 0.359 | 0.228 | 5.604 |
| 0.368 | 0.242 | 5.604 |
| 0.376 | 0.257 | 5.604 |
| 0.384 | 0.271 | 5.604 |
| 0.393 | 0.285 | 5.604 |
| 0.401 | 0.299 | 5.604 |
| 0.409 | 0.314 | 5.604 |
| 0.417 | 0.328 | 5.604 |
| 0.424 | 0.343 | 5.604 |
| 0.432 | 0.357 | 5.604 |
| 0.439 | 0.372 | 5.604 |
| 0.447 | 0.387 | 5.604 |
| 0.454 | 0.402 | 5.604 |
| 0.461 | 0.416 | 5.604 |
| 0.468 | 0.431 | 5.604 |
| 0.475 | 0.446 | 5.604 |
| 0.481 | 0.461 | 5.604 |
| 0.483 | 0.464 | 5.604 |
| 0.484 | 0.467 | 5.604 |
| 0.485 | 0.470 | 5.604 |
| 0.487 | 0.473 | 5.604 |
| 0.488 | 0.476 | 5.604 |
| 0.489 | 0.480 | 5.604 |
| 0.491 | 0.483 | 5.604 |
| 0.492 | 0.486 | 5.604 |
| 0.493 | 0.489 | 5.604 |
| 0.495 | 0.492 | 5.604 |
| 0.495 | 0.493 | 5.604 |
| 0.495 | 0.495 | 5.604 |
| 0.495 | 0.497 | 5.604 |
| 0.495 | 0.498 | 5.604 |
| 0.495 | 0.500 | 5.604 |
| 0.494 | 0.502 | 5.604 |
| 0.493 | 0.503 | 5.604 |
| 0.492 | 0.505 | 5.604 |
| 0.491 | 0.506 | 5.604 |
| 0.489 | 0.507 | 5.604 |
| 0.487 | 0.507 | 5.604 |
| 0.486 | 0.508 | 5.604 |
| 0.484 | 0.508 | 5.604 |
| 0.482 | 0.508 | 5.604 |
| 0.481 | 0.507 | 5.604 |
| 0.479 | 0.507 | 5.604 |
| 0.477 | 0.506 | 5.604 |
| 0.476 | 0.505 | 5.604 |
| 0.475 | 0.503 | 5.604 |
| 0.473 | 0.501 | 5.604 |
| 0.472 | 0.499 | 5.604 |
| 0.470 | 0.497 | 5.604 |
| 0.469 | 0.495 | 5.604 |
| 0.467 | 0.493 | 5.604 |
| 0.466 | 0.491 | 5.604 |
| 0.464 | 0.490 | 5.604 |
| 0.463 | 0.488 | 5.604 |
| 0.461 | 0.486 | 5.604 |
| 0.460 | 0.484 | 5.604 |
| 0.452 | 0.474 | 5.604 |
| 0.445 | 0.464 | 5.604 |
| 0.437 | 0.455 | 5.604 |
| 0.430 | 0.445 | 5.604 |
| 0.422 | 0.435 | 5.604 |
| 0.414 | 0.426 | 5.604 |
| 0.407 | 0.416 | 5.604 |
| 0.399 | 0.406 | 5.604 |
| 0.391 | 0.397 | 5.604 |
| 0.383 | 0.387 | 5.604 |
| 0.376 | 0.378 | 5.604 |
| 0.368 | 0.368 | 5.604 |
| 0.360 | 0.359 | 5.604 |
| 0.352 | 0.349 | 5.604 |
| 0.344 | 0.340 | 5.604 |
| 0.336 | 0.331 | 5.604 |
| 0.328 | 0.321 | 5.604 |
| 0.320 | 0.312 | 5.604 |

TABLE 2-continued

| | X | Y | Z |
|---|---|---|---|
| | 0.312 | 0.303 | 5.604 |
| | 0.304 | 0.293 | 5.604 |
| | 0.296 | 0.284 | 5.604 |
| | 0.287 | 0.275 | 5.604 |
| | 0.279 | 0.266 | 5.604 |
| | 0.271 | 0.257 | 5.604 |
| | 0.262 | 0.248 | 5.604 |
| | 0.254 | 0.239 | 5.604 |
| | 0.245 | 0.230 | 5.604 |
| | 0.237 | 0.221 | 5.604 |
| | 0.228 | 0.212 | 5.604 |
| | 0.220 | 0.203 | 5.604 |
| | 0.211 | 0.195 | 5.604 |
| | 0.202 | 0.186 | 5.604 |
| | 0.193 | 0.178 | 5.604 |
| | 0.184 | 0.169 | 5.604 |
| | 0.175 | 0.161 | 5.604 |
| | 0.166 | 0.153 | 5.604 |
| | 0.157 | 0.144 | 5.604 |
| | 0.147 | 0.136 | 5.604 |
| | 0.138 | 0.128 | 5.604 |
| | 0.128 | 0.121 | 5.604 |
| | 0.119 | 0.113 | 5.604 |
| | 0.109 | 0.105 | 5.604 |
| | 0.099 | 0.098 | 5.604 |
| | 0.090 | 0.090 | 5.604 |
| | 0.080 | 0.083 | 5.604 |
| | 0.070 | 0.076 | 5.604 |
| | 0.059 | 0.069 | 5.604 |
| | 0.049 | 0.062 | 5.604 |
| | 0.039 | 0.056 | 5.604 |
| | 0.028 | 0.049 | 5.604 |
| | 0.018 | 0.043 | 5.604 |
| | 0.007 | 0.037 | 5.604 |
| | −0.004 | 0.031 | 5.604 |
| | −0.015 | 0.025 | 5.604 |
| | −0.026 | 0.019 | 5.604 |
| | −0.037 | 0.014 | 5.604 |
| | −0.048 | 0.009 | 5.604 |
| | −0.059 | 0.004 | 5.604 |
| | −0.071 | −0.001 | 5.604 |
| | −0.082 | −0.005 | 5.604 |
| | −0.094 | −0.009 | 5.604 |
| | −0.105 | −0.013 | 5.604 |
| | −0.117 | −0.017 | 5.604 |
| | −0.129 | −0.021 | 5.604 |
| | −0.141 | −0.024 | 5.604 |
| | −0.153 | −0.027 | 5.604 |
| | −0.165 | −0.030 | 5.604 |
| | −0.177 | −0.032 | 5.604 |
| | −0.189 | −0.034 | 5.604 |
| | −0.201 | −0.036 | 5.604 |
| | −0.213 | −0.038 | 5.604 |
| | −0.225 | −0.040 | 5.604 |
| | −0.238 | −0.041 | 5.604 |
| | −0.250 | −0.042 | 5.604 |
| | −0.262 | −0.043 | 5.604 |
| | −0.274 | −0.044 | 5.604 |
| | −0.287 | −0.044 | 5.604 |
| | −0.299 | −0.044 | 5.604 |
| | −0.311 | −0.044 | 5.604 |
| | −0.314 | −0.044 | 5.604 |
| | −0.316 | −0.044 | 5.604 |
| | −0.319 | −0.044 | 5.604 |
| | −0.321 | −0.044 | 5.604 |
| | −0.324 | −0.044 | 5.604 |
| | −0.326 | −0.044 | 5.604 |
| | −0.329 | −0.044 | 5.604 |
| | −0.331 | −0.044 | 5.604 |
| | −0.334 | −0.044 | 5.604 |
| | −0.336 | −0.044 | 5.604 |
| | −0.343 | −0.044 | 5.604 |
| | −0.350 | −0.044 | 5.604 |
| | −0.356 | −0.045 | 5.604 |
| | −0.363 | −0.046 | 5.604 |
| | −0.370 | −0.048 | 5.604 |
| | −0.376 | −0.051 | 5.604 |
| | −0.382 | −0.054 | 5.604 |
| | −0.388 | −0.058 | 5.604 |
| | −0.394 | −0.062 | 5.604 |
| | −0.399 | −0.067 | 5.604 |
| | −0.403 | −0.072 | 5.604 |
| | −0.407 | −0.077 | 5.604 |
| | −0.411 | −0.083 | 5.604 |
| | −0.414 | −0.089 | 5.604 |
| | −0.417 | −0.095 | 5.604 |
| | −0.419 | −0.102 | 5.604 |
| | −0.421 | −0.108 | 5.604 |
| | −0.423 | −0.115 | 5.604 |
| SECTION 2 | −0.420 | −0.156 | 5.754 |
| | −0.419 | −0.159 | 5.754 |
| | −0.418 | −0.162 | 5.754 |
| | −0.416 | −0.165 | 5.754 |
| | −0.415 | −0.168 | 5.754 |
| | −0.414 | −0.171 | 5.754 |
| | −0.412 | −0.174 | 5.754 |
| | −0.411 | −0.177 | 5.754 |
| | −0.409 | −0.180 | 5.754 |
| | −0.408 | −0.183 | 5.754 |
| | −0.406 | −0.186 | 5.754 |
| | −0.397 | −0.199 | 5.754 |
| | −0.386 | −0.211 | 5.754 |
| | −0.375 | −0.223 | 5.754 |
| | −0.362 | −0.233 | 5.754 |
| | −0.348 | −0.242 | 5.754 |
| | −0.334 | −0.250 | 5.754 |
| | −0.319 | −0.256 | 5.754 |
| | −0.304 | −0.262 | 5.754 |
| | −0.288 | −0.266 | 5.754 |
| | −0.272 | −0.268 | 5.754 |
| | −0.256 | −0.270 | 5.754 |
| | −0.240 | −0.271 | 5.754 |
| | −0.223 | −0.270 | 5.754 |
| | −0.207 | −0.269 | 5.754 |
| | −0.191 | −0.267 | 5.754 |
| | −0.175 | −0.263 | 5.754 |
| | −0.159 | −0.259 | 5.754 |
| | −0.144 | −0.254 | 5.754 |
| | −0.129 | −0.249 | 5.754 |
| | −0.114 | −0.242 | 5.754 |
| | −0.099 | −0.236 | 5.754 |
| | −0.084 | −0.228 | 5.754 |
| | −0.070 | −0.220 | 5.754 |
| | −0.056 | −0.212 | 5.754 |
| | −0.042 | −0.204 | 5.754 |
| | −0.029 | −0.194 | 5.754 |
| | −0.015 | −0.185 | 5.754 |
| | −0.002 | −0.175 | 5.754 |
| | 0.010 | −0.165 | 5.754 |
| | 0.023 | −0.155 | 5.754 |
| | 0.036 | −0.145 | 5.754 |
| | 0.048 | −0.134 | 5.754 |
| | 0.060 | −0.123 | 5.754 |
| | 0.072 | −0.112 | 5.754 |
| | 0.084 | −0.101 | 5.754 |
| | 0.095 | −0.089 | 5.754 |
| | 0.107 | −0.078 | 5.754 |
| | 0.118 | −0.066 | 5.754 |
| | 0.129 | −0.054 | 5.754 |
| | 0.140 | −0.042 | 5.754 |
| | 0.151 | −0.030 | 5.754 |
| | 0.162 | −0.018 | 5.754 |
| | 0.172 | −0.006 | 5.754 |
| | 0.183 | 0.007 | 5.754 |
| | 0.193 | 0.019 | 5.754 |
| | 0.204 | 0.032 | 5.754 |
| | 0.214 | 0.044 | 5.754 |
| | 0.224 | 0.057 | 5.754 |
| | 0.234 | 0.070 | 5.754 |
| | 0.244 | 0.083 | 5.754 |
| | 0.254 | 0.096 | 5.754 |
| | 0.264 | 0.109 | 5.754 |
| | 0.273 | 0.122 | 5.754 |
| | 0.283 | 0.135 | 5.754 |

TABLE 2-continued

| X | Y | Z |
|---|---|---|
| 0.292 | 0.149 | 5.754 |
| 0.301 | 0.162 | 5.754 |
| 0.310 | 0.175 | 5.754 |
| 0.319 | 0.189 | 5.754 |
| 0.328 | 0.203 | 5.754 |
| 0.337 | 0.216 | 5.754 |
| 0.346 | 0.230 | 5.754 |
| 0.354 | 0.244 | 5.754 |
| 0.363 | 0.258 | 5.754 |
| 0.371 | 0.272 | 5.754 |
| 0.379 | 0.286 | 5.754 |
| 0.387 | 0.300 | 5.754 |
| 0.395 | 0.314 | 5.754 |
| 0.403 | 0.328 | 5.754 |
| 0.411 | 0.343 | 5.754 |
| 0.418 | 0.357 | 5.754 |
| 0.426 | 0.372 | 5.754 |
| 0.433 | 0.386 | 5.754 |
| 0.440 | 0.401 | 5.754 |
| 0.447 | 0.416 | 5.754 |
| 0.454 | 0.430 | 5.754 |
| 0.461 | 0.445 | 5.754 |
| 0.467 | 0.460 | 5.754 |
| 0.474 | 0.475 | 5.754 |
| 0.480 | 0.490 | 5.754 |
| 0.482 | 0.493 | 5.754 |
| 0.483 | 0.496 | 5.754 |
| 0.484 | 0.499 | 5.754 |
| 0.485 | 0.502 | 5.754 |
| 0.487 | 0.505 | 5.754 |
| 0.488 | 0.508 | 5.754 |
| 0.489 | 0.511 | 5.754 |
| 0.490 | 0.514 | 5.754 |
| 0.492 | 0.517 | 5.754 |
| 0.493 | 0.520 | 5.754 |
| 0.494 | 0.521 | 5.754 |
| 0.494 | 0.523 | 5.754 |
| 0.494 | 0.525 | 5.754 |
| 0.494 | 0.527 | 5.754 |
| 0.493 | 0.528 | 5.754 |
| 0.492 | 0.530 | 5.754 |
| 0.491 | 0.531 | 5.754 |
| 0.490 | 0.533 | 5.754 |
| 0.489 | 0.534 | 5.754 |
| 0.487 | 0.535 | 5.754 |
| 0.486 | 0.535 | 5.754 |
| 0.484 | 0.536 | 5.754 |
| 0.482 | 0.536 | 5.754 |
| 0.481 | 0.536 | 5.754 |
| 0.479 | 0.535 | 5.754 |
| 0.477 | 0.535 | 5.754 |
| 0.476 | 0.534 | 5.754 |
| 0.474 | 0.533 | 5.754 |
| 0.473 | 0.531 | 5.754 |
| 0.472 | 0.529 | 5.754 |
| 0.470 | 0.527 | 5.754 |
| 0.469 | 0.525 | 5.754 |
| 0.467 | 0.523 | 5.754 |
| 0.466 | 0.521 | 5.754 |
| 0.464 | 0.519 | 5.754 |
| 0.463 | 0.517 | 5.754 |
| 0.461 | 0.515 | 5.754 |
| 0.459 | 0.513 | 5.754 |
| 0.458 | 0.511 | 5.754 |
| 0.450 | 0.501 | 5.754 |
| 0.443 | 0.491 | 5.754 |
| 0.435 | 0.480 | 5.754 |
| 0.427 | 0.470 | 5.754 |
| 0.419 | 0.460 | 5.754 |
| 0.412 | 0.450 | 5.754 |
| 0.404 | 0.440 | 5.754 |
| 0.396 | 0.430 | 5.754 |
| 0.388 | 0.420 | 5.754 |
| 0.380 | 0.410 | 5.754 |
| 0.372 | 0.400 | 5.754 |
| 0.365 | 0.390 | 5.754 |
| 0.357 | 0.380 | 5.754 |

TABLE 2-continued

| X | Y | Z |
|---|---|---|
| 0.349 | 0.370 | 5.754 |
| 0.341 | 0.360 | 5.754 |
| 0.333 | 0.351 | 5.754 |
| 0.324 | 0.341 | 5.754 |
| 0.316 | 0.331 | 5.754 |
| 0.308 | 0.321 | 5.754 |
| 0.300 | 0.311 | 5.754 |
| 0.292 | 0.302 | 5.754 |
| 0.284 | 0.292 | 5.754 |
| 0.275 | 0.282 | 5.754 |
| 0.267 | 0.273 | 5.754 |
| 0.259 | 0.263 | 5.754 |
| 0.250 | 0.254 | 5.754 |
| 0.242 | 0.244 | 5.754 |
| 0.233 | 0.235 | 5.754 |
| 0.224 | 0.226 | 5.754 |
| 0.216 | 0.216 | 5.754 |
| 0.207 | 0.207 | 5.754 |
| 0.198 | 0.198 | 5.754 |
| 0.189 | 0.189 | 5.754 |
| 0.180 | 0.180 | 5.754 |
| 0.171 | 0.171 | 5.754 |
| 0.162 | 0.162 | 5.754 |
| 0.153 | 0.153 | 5.754 |
| 0.144 | 0.145 | 5.754 |
| 0.134 | 0.136 | 5.754 |
| 0.125 | 0.127 | 5.754 |
| 0.115 | 0.119 | 5.754 |
| 0.105 | 0.111 | 5.754 |
| 0.096 | 0.103 | 5.754 |
| 0.086 | 0.095 | 5.754 |
| 0.076 | 0.087 | 5.754 |
| 0.066 | 0.079 | 5.754 |
| 0.056 | 0.071 | 5.754 |
| 0.046 | 0.064 | 5.754 |
| 0.035 | 0.056 | 5.754 |
| 0.025 | 0.049 | 5.754 |
| 0.014 | 0.042 | 5.754 |
| 0.003 | 0.035 | 5.754 |
| −0.007 | 0.028 | 5.754 |
| −0.018 | 0.022 | 5.754 |
| −0.029 | 0.016 | 5.754 |
| −0.041 | 0.009 | 5.754 |
| −0.052 | 0.004 | 5.754 |
| −0.063 | −0.002 | 5.754 |
| −0.075 | −0.008 | 5.754 |
| −0.086 | −0.013 | 5.754 |
| −0.098 | −0.018 | 5.754 |
| −0.110 | −0.023 | 5.754 |
| −0.122 | −0.027 | 5.754 |
| −0.134 | −0.031 | 5.754 |
| −0.146 | −0.035 | 5.754 |
| −0.158 | −0.039 | 5.754 |
| −0.170 | −0.042 | 5.754 |
| −0.183 | −0.045 | 5.754 |
| −0.195 | −0.048 | 5.754 |
| −0.207 | −0.051 | 5.754 |
| −0.220 | −0.053 | 5.754 |
| −0.232 | −0.055 | 5.754 |
| −0.245 | −0.057 | 5.754 |
| −0.258 | −0.059 | 5.754 |
| −0.270 | −0.060 | 5.754 |
| −0.283 | −0.061 | 5.754 |
| −0.296 | −0.062 | 5.754 |
| −0.308 | −0.062 | 5.754 |
| −0.321 | −0.062 | 5.754 |
| −0.324 | −0.062 | 5.754 |
| −0.326 | −0.062 | 5.754 |
| −0.329 | −0.002 | 5.754 |
| −0.331 | −0.062 | 5.754 |
| −0.334 | −0.062 | 5.754 |
| −0.336 | −0.062 | 5.754 |
| −0.339 | −0.062 | 5.754 |
| −0.341 | −0.062 | 5.754 |
| −0.344 | −0.062 | 5.754 |
| −0.347 | −0.062 | 5.754 |
| −0.354 | −0.062 | 5.754 |

TABLE 2-continued

|  | X | Y | Z |
|---|---|---|---|
|  | −0.361 | −0.063 | 5.754 |
|  | −0.368 | −0.064 | 5.754 |
|  | −0.376 | −0.066 | 5.754 |
|  | −0.382 | −0.069 | 5.754 |
|  | −0.389 | −0.072 | 5.754 |
|  | −0.395 | −0.076 | 5.754 |
|  | −0.401 | −0.081 | 5.754 |
|  | −0.406 | −0.087 | 5.754 |
|  | −0.410 | −0.092 | 5.754 |
|  | −0.414 | −0.099 | 5.754 |
|  | −0.417 | −0.106 | 5.754 |
|  | −0.419 | −0.112 | 5.754 |
|  | −0.421 | −0.120 | 5.754 |
|  | −0.422 | −0.127 | 5.754 |
|  | −0.422 | −0.134 | 5.754 |
|  | −0.422 | −0.142 | 5.754 |
|  | −0.421 | −0.149 | 5.754 |
| SECTION 3 | −0.415 | −0.196 | 5.954 |
|  | −0.413 | −0.198 | 5.954 |
|  | −0.411 | −0.201 | 5.954 |
|  | −0.409 | −0.203 | 5.954 |
|  | −0.407 | −0.206 | 5.954 |
|  | −0.404 | −0.208 | 5.954 |
|  | −0.402 | −0.211 | 5.954 |
|  | −0.400 | −0.213 | 5.954 |
|  | −0.398 | −0.215 | 5.954 |
|  | −0.395 | −0.217 | 5.954 |
|  | −0.393 | −0.220 | 5.954 |
|  | −0.381 | −0.230 | 5.954 |
|  | −0.367 | −0.239 | 5.954 |
|  | −0.353 | −0.247 | 5.954 |
|  | −0.338 | −0.253 | 5.954 |
|  | −0.323 | −0.259 | 5.954 |
|  | −0.308 | −0.263 | 5.954 |
|  | −0.292 | −0.266 | 5.954 |
|  | −0.276 | −0.268 | 5.954 |
|  | −0.260 | −0.269 | 5.954 |
|  | −0.244 | −0.269 | 5.954 |
|  | −0.227 | −0.268 | 5.954 |
|  | −0.211 | −0.266 | 5.954 |
|  | −0.196 | −0.263 | 5.954 |
|  | −0.180 | −0.259 | 5.954 |
|  | −0.164 | −0.255 | 5.954 |
|  | −0.149 | −0.250 | 5.954 |
|  | −0.134 | −0.244 | 5.954 |
|  | −0.119 | −0.237 | 5.954 |
|  | −0.105 | −0.230 | 5.954 |
|  | −0.090 | −0.223 | 5.954 |
|  | −0.076 | −0.215 | 5.954 |
|  | −0.063 | −0.206 | 5.954 |
|  | −0.049 | −0.198 | 5.954 |
|  | −0.036 | −0.189 | 5.954 |
|  | −0.023 | −0.179 | 5.954 |
|  | −0.010 | −0.169 | 5.954 |
|  | 0.003 | −0.159 | 5.954 |
|  | 0.015 | −0.149 | 5.954 |
|  | 0.027 | −0.138 | 5.954 |
|  | 0.039 | −0.128 | 5.954 |
|  | 0.051 | −0.117 | 5.954 |
|  | 0.063 | −0.106 | 5.954 |
|  | 0.075 | −0.094 | 5.954 |
|  | 0.086 | −0.083 | 5.954 |
|  | 0.097 | −0.071 | 5.954 |
|  | 0.108 | −0.060 | 5.954 |
|  | 0.119 | −0.048 | 5.954 |
|  | 0.130 | −0.036 | 5.954 |
|  | 0.141 | −0.024 | 5.954 |
|  | 0.151 | −0.012 | 5.954 |
|  | 0.162 | 0.001 | 5.954 |
|  | 0.172 | 0.013 | 5.954 |
|  | 0.182 | 0.026 | 5.954 |
|  | 0.192 | 0.038 | 5.954 |
|  | 0.202 | 0.051 | 5.954 |
|  | 0.212 | 0.064 | 5.954 |
|  | 0.222 | 0.076 | 5.954 |
|  | 0.232 | 0.089 | 5.954 |
|  | 0.241 | 0.102 | 5.954 |

TABLE 2-continued

| X | Y | Z |
|---|---|---|
| 0.251 | 0.115 | 5.954 |
| 0.260 | 0.129 | 5.954 |
| 0.269 | 0.142 | 5.954 |
| 0.278 | 0.155 | 5.954 |
| 0.288 | 0.168 | 5.954 |
| 0.296 | 0.182 | 5.954 |
| 0.305 | 0.195 | 5.954 |
| 0.314 | 0.209 | 5.954 |
| 0.323 | 0.223 | 5.954 |
| 0.331 | 0.236 | 5.954 |
| 0.339 | 0.250 | 5.954 |
| 0.348 | 0.264 | 5.954 |
| 0.356 | 0.278 | 5.954 |
| 0.364 | 0.292 | 5.954 |
| 0.372 | 0.306 | 5.954 |
| 0.379 | 0.320 | 5.954 |
| 0.387 | 0.334 | 5.954 |
| 0.394 | 0.349 | 5.954 |
| 0.402 | 0.363 | 5.954 |
| 0.409 | 0.377 | 5.954 |
| 0.416 | 0.392 | 5.954 |
| 0.423 | 0.406 | 5.954 |
| 0.430 | 0.421 | 5.954 |
| 0.437 | 0.436 | 5.954 |
| 0.444 | 0.450 | 5.954 |
| 0.450 | 0.465 | 5.954 |
| 0.457 | 0.480 | 5.954 |
| 0.463 | 0.495 | 5.954 |
| 0.469 | 0.510 | 5.954 |
| 0.476 | 0.524 | 5.954 |
| 0.477 | 0.527 | 5.954 |
| 0.478 | 0.530 | 5.954 |
| 0.479 | 0.533 | 5.954 |
| 0.480 | 0.536 | 5.954 |
| 0.482 | 0.539 | 5.954 |
| 0.483 | 0.542 | 5.954 |
| 0.484 | 0.545 | 5.954 |
| 0.485 | 0.548 | 5.954 |
| 0.486 | 0.551 | 5.954 |
| 0.488 | 0.554 | 5.954 |
| 0.488 | 0.556 | 5.954 |
| 0.488 | 0.558 | 5.954 |
| 0.488 | 0.559 | 5.954 |
| 0.488 | 0.561 | 5.954 |
| 0.488 | 0.563 | 5.954 |
| 0.487 | 0.564 | 5.954 |
| 0.486 | 0.566 | 5.954 |
| 0.485 | 0.567 | 5.954 |
| 0.483 | 0.568 | 5.954 |
| 0.482 | 0.569 | 5.954 |
| 0.480 | 0.570 | 5.954 |
| 0.478 | 0.570 | 5.954 |
| 0.477 | 0.570 | 5.954 |
| 0.475 | 0.570 | 5.954 |
| 0.473 | 0.570 | 5.954 |
| 0.472 | 0.569 | 5.954 |
| 0.470 | 0.568 | 5.954 |
| 0.469 | 0.567 | 5.954 |
| 0.468 | 0.566 | 5.954 |
| 0.466 | 0.563 | 5.954 |
| 0.465 | 0.561 | 5.954 |
| 0.463 | 0.559 | 5.954 |
| 0.461 | 0.557 | 5.954 |
| 0.460 | 0.555 | 5.954 |
| 0.458 | 0.553 | 5.954 |
| 0.457 | 0.551 | 5.954 |
| 0.455 | 0.548 | 5.954 |
| 0.454 | 0.546 | 5.954 |
| 0.452 | 0.544 | 5.954 |
| 0.444 | 0.534 | 5.954 |
| 0.437 | 0.523 | 5.954 |
| 0.429 | 0.512 | 5.954 |
| 0.421 | 0.502 | 5.954 |
| 0.413 | 0.491 | 5.954 |
| 0.405 | 0.481 | 5.954 |
| 0.397 | 0.470 | 5.954 |
| 0.389 | 0.460 | 5.954 |

TABLE 2-continued

| X | Y | Z |
|---|---|---|
| 0.382 | 0.449 | 5.954 |
| 0.374 | 0.438 | 5.954 |
| 0.366 | 0.428 | 5.954 |
| 0.358 | 0.417 | 5.954 |
| 0.350 | 0.407 | 5.954 |
| 0.342 | 0.397 | 5.954 |
| 0.334 | 0.386 | 5.954 |
| 0.326 | 0.376 | 5.954 |
| 0.318 | 0.365 | 5.954 |
| 0.309 | 0.355 | 5.954 |
| 0.301 | 0.345 | 5.954 |
| 0.293 | 0.334 | 5.954 |
| 0.285 | 0.324 | 5.954 |
| 0.277 | 0.314 | 5.954 |
| 0.268 | 0.304 | 5.954 |
| 0.260 | 0.293 | 5.954 |
| 0.252 | 0.283 | 5.954 |
| 0.243 | 0.273 | 5.954 |
| 0.235 | 0.263 | 5.954 |
| 0.226 | 0.253 | 5.954 |
| 0.217 | 0.243 | 5.954 |
| 0.209 | 0.233 | 5.954 |
| 0.200 | 0.223 | 5.954 |
| 0.191 | 0.213 | 5.954 |
| 0.183 | 0.204 | 5.954 |
| 0.174 | 0.194 | 5.954 |
| 0.165 | 0.184 | 5.954 |
| 0.156 | 0.175 | 5.954 |
| 0.146 | 0.165 | 5.954 |
| 0.137 | 0.156 | 5.954 |
| 0.128 | 0.146 | 5.954 |
| 0.119 | 0.137 | 5.954 |
| 0.109 | 0.128 | 5.954 |
| 0.100 | 0.119 | 5.954 |
| 0.090 | 0.110 | 5.954 |
| 0.080 | 0.101 | 5.954 |
| 0.070 | 0.092 | 5.954 |
| 0.060 | 0.084 | 5.954 |
| 0.050 | 0.075 | 5.954 |
| 0.040 | 0.067 | 5.954 |
| 0.030 | 0.059 | 5.954 |
| 0.019 | 0.051 | 5.954 |
| 0.009 | 0.043 | 5.954 |
| −0.002 | 0.035 | 5.954 |
| −0.012 | 0.027 | 5.954 |
| −0.023 | 0.020 | 5.954 |
| −0.034 | 0.013 | 5.954 |
| −0.045 | 0.006 | 5.954 |
| −0.057 | −0.001 | 5.954 |
| −0.068 | −0.008 | 5.954 |
| −0.080 | −0.014 | 5.954 |
| −0.091 | −0.020 | 5.954 |
| −0.103 | −0.026 | 5.954 |
| −0.115 | −0.032 | 5.954 |
| −0.127 | −0.037 | 5.954 |
| −0.139 | −0.043 | 5.954 |
| −0.151 | −0.047 | 5.954 |
| −0.164 | −0.052 | 5.954 |
| −0.176 | −0.056 | 5.954 |
| −0.189 | −0.060 | 5.954 |
| −0.201 | −0.064 | 5.954 |
| −0.214 | −0.067 | 5.954 |
| −0.227 | −0.070 | 5.954 |
| −0.240 | −0.073 | 5.954 |
| −0.253 | −0.075 | 5.954 |
| −0.266 | −0.077 | 5.954 |
| −0.279 | −0.079 | 5.954 |
| −0.292 | −0.081 | 5.954 |
| −0.305 | −0.082 | 5.954 |
| −0.318 | −0.082 | 5.954 |
| −0.331 | −0.083 | 5.954 |
| −0.334 | −0.083 | 5.954 |
| −0.337 | −0.083 | 5.954 |
| −0.339 | −0.083 | 5.954 |
| −0.342 | −0.083 | 5.954 |
| −0.344 | −0.083 | 5.954 |
| −0.347 | −0.083 | 5.954 |
| −0.350 | −0.083 | 5.954 |
| −0.352 | −0.083 | 5.954 |
| −0.355 | −0.083 | 5.954 |
| −0.358 | −0.083 | 5.954 |
| −0.366 | −0.083 | 5.954 |
| −0.375 | −0.084 | 5.954 |
| −0.383 | −0.085 | 5.954 |
| −0.391 | −0.088 | 5.954 |
| −0.399 | −0.092 | 5.954 |
| −0.406 | −0.096 | 5.954 |
| −0.413 | −0.102 | 5.954 |
| −0.419 | −0.108 | 5.954 |
| −0.424 | −0.115 | 5.954 |
| −0.427 | −0.123 | 5.954 |
| −0.430 | −0.131 | 5.954 |
| −0.432 | −0.140 | 5.954 |
| −0.432 | −0.148 | 5.954 |
| −0.432 | −0.157 | 5.954 |
| −0.430 | −0.165 | 5.954 |
| −0.427 | −0.173 | 5.954 |
| −0.424 | −0.181 | 5.954 |
| −0.420 | −0.189 | 5.954 |

SECTION 4

| X | Y | Z |
|---|---|---|
| −0.410 | −0.220 | 6.104 |
| −0.408 | −0.223 | 6.104 |
| −0.405 | −0.225 | 6.104 |
| −0.403 | −0.227 | 6.104 |
| −0.400 | −0.229 | 6.104 |
| −0.398 | −0.230 | 6.104 |
| −0.395 | −0.232 | 6.104 |
| −0.392 | −0.234 | 6.104 |
| −0.390 | −0.236 | 6.104 |
| −0.387 | −0.238 | 6.104 |
| −0.384 | −0.239 | 6.104 |
| −0.370 | −0.247 | 6.104 |
| −0.355 | −0.254 | 6.104 |
| −0.340 | −0.259 | 6.104 |
| −0.325 | −0.263 | 6.104 |
| −0.309 | −0.267 | 6.104 |
| −0.293 | −0.269 | 6.104 |
| −0.277 | −0.270 | 6.104 |
| −0.261 | −0.270 | 6.104 |
| −0.245 | −0.269 | 6.104 |
| −0.229 | −0.268 | 6.104 |
| −0.213 | −0.265 | 6.104 |
| −0.197 | −0.262 | 6.104 |
| −0.181 | −0.258 | 6.104 |
| −0.166 | −0.253 | 6.104 |
| −0.151 | −0.248 | 6.104 |
| −0.136 | −0.241 | 6.104 |
| −0.121 | −0.235 | 6.104 |
| −0.107 | −0.227 | 6.104 |
| −0.093 | −0.220 | 6.104 |
| −0.079 | −0.211 | 6.104 |
| −0.065 | −0.203 | 6.104 |
| −0.052 | −0.194 | 6.104 |
| −0.039 | −0.185 | 6.104 |
| −0.026 | −0.175 | 6.104 |
| −0.013 | −0.165 | 6.104 |
| −0.001 | −0.155 | 6.104 |
| 0.011 | −0.144 | 6.104 |
| 0.023 | −0.134 | 6.104 |
| 0.035 | −0.123 | 6.104 |
| 0.047 | −0.112 | 6.104 |
| 0.059 | −0.101 | 6.104 |
| 0.070 | −0.089 | 6.104 |
| 0.081 | −0.078 | 6.104 |
| 0.092 | −0.066 | 6.104 |
| 0.103 | −0.054 | 6.104 |
| 0.114 | −0.042 | 6.104 |
| 0.125 | −0.030 | 6.104 |
| 0.135 | −0.018 | 6.104 |
| 0.146 | −0.006 | 6.104 |
| 0.156 | 0.007 | 6.104 |
| 0.166 | 0.019 | 6.104 |
| 0.176 | 0.032 | 6.104 |
| 0.186 | 0.044 | 6.104 |
| 0.196 | 0.057 | 6.104 |

TABLE 2-continued

| X | Y | Z |
|---|---|---|
| 0.206 | 0.070 | 6.104 |
| 0.215 | 0.083 | 6.104 |
| 0.225 | 0.096 | 6.104 |
| 0.234 | 0.109 | 6.104 |
| 0.243 | 0.122 | 6.104 |
| 0.252 | 0.136 | 6.104 |
| 0.262 | 0.149 | 6.104 |
| 0.270 | 0.162 | 6.104 |
| 0.279 | 0.176 | 6.104 |
| 0.288 | 0.189 | 6.104 |
| 0.297 | 0.203 | 6.104 |
| 0.305 | 0.216 | 6.104 |
| 0.314 | 0.230 | 6.104 |
| 0.322 | 0.244 | 6.104 |
| 0.330 | 0.258 | 6.104 |
| 0.338 | 0.272 | 6.104 |
| 0.346 | 0.286 | 6.104 |
| 0.354 | 0.300 | 6.104 |
| 0.362 | 0.314 | 6.104 |
| 0.369 | 0.328 | 6.104 |
| 0.377 | 0.343 | 6.104 |
| 0.384 | 0.357 | 6.104 |
| 0.391 | 0.371 | 6.104 |
| 0.398 | 0.386 | 6.104 |
| 0.405 | 0.400 | 6.104 |
| 0.412 | 0.415 | 6.104 |
| 0.419 | 0.429 | 6.104 |
| 0.426 | 0.444 | 6.104 |
| 0.432 | 0.459 | 6.104 |
| 0.439 | 0.474 | 6.104 |
| 0.445 | 0.488 | 6.104 |
| 0.451 | 0.503 | 6.104 |
| 0.457 | 0.518 | 6.104 |
| 0.463 | 0.533 | 6.104 |
| 0.469 | 0.548 | 6.104 |
| 0.470 | 0.551 | 6.104 |
| 0.472 | 0.554 | 6.104 |
| 0.473 | 0.557 | 6.104 |
| 0.474 | 0.560 | 6.104 |
| 0.475 | 0.563 | 6.104 |
| 0.476 | 0.566 | 6.104 |
| 0.477 | 0.569 | 6.104 |
| 0.479 | 0.572 | 6.104 |
| 0.480 | 0.575 | 6.104 |
| 0.481 | 0.578 | 6.104 |
| 0.481 | 0.580 | 6.104 |
| 0.482 | 0.581 | 6.104 |
| 0.482 | 0.583 | 6.104 |
| 0.481 | 0.585 | 6.104 |
| 0.481 | 0.587 | 6.104 |
| 0.480 | 0.588 | 6.104 |
| 0.479 | 0.590 | 6.104 |
| 0.478 | 0.591 | 6.104 |
| 0.476 | 0.592 | 6.104 |
| 0.475 | 0.593 | 6.104 |
| 0.473 | 0.593 | 6.104 |
| 0.472 | 0.594 | 6.104 |
| 0.470 | 0.594 | 6.104 |
| 0.468 | 0.594 | 6.104 |
| 0.466 | 0.593 | 6.104 |
| 0.465 | 0.592 | 6.104 |
| 0.463 | 0.591 | 6.104 |
| 0.462 | 0.590 | 6.104 |
| 0.461 | 0.589 | 6.104 |
| 0.459 | 0.587 | 6.104 |
| 0.458 | 0.585 | 6.104 |
| 0.456 | 0.582 | 6.104 |
| 0.455 | 0.580 | 6.104 |
| 0.453 | 0.578 | 6.104 |
| 0.451 | 0.576 | 6.104 |
| 0.450 | 0.574 | 6.104 |
| 0.448 | 0.571 | 6.104 |
| 0.447 | 0.569 | 6.104 |
| 0.445 | 0.567 | 6.104 |
| 0.437 | 0.556 | 6.104 |
| 0.430 | 0.545 | 6.104 |
| 0.422 | 0.534 | 6.104 |
| 0.414 | 0.523 | 6.104 |
| 0.406 | 0.513 | 6.104 |
| 0.398 | 0.502 | 6.104 |
| 0.390 | 0.491 | 6.104 |
| 0.382 | 0.480 | 6.104 |
| 0.375 | 0.469 | 6.104 |
| 0.367 | 0.458 | 6.104 |
| 0.359 | 0.447 | 6.104 |
| 0.351 | 0.437 | 6.104 |
| 0.343 | 0.426 | 6.104 |
| 0.335 | 0.415 | 6.104 |
| 0.327 | 0.404 | 6.104 |
| 0.319 | 0.393 | 6.104 |
| 0.311 | 0.383 | 6.104 |
| 0.303 | 0.372 | 6.104 |
| 0.294 | 0.361 | 6.104 |
| 0.286 | 0.351 | 6.104 |
| 0.278 | 0.340 | 6.104 |
| 0.270 | 0.329 | 6.104 |
| 0.262 | 0.319 | 6.104 |
| 0.253 | 0.308 | 6.104 |
| 0.245 | 0.298 | 6.104 |
| 0.237 | 0.287 | 6.104 |
| 0.228 | 0.277 | 6.104 |
| 0.220 | 0.266 | 6.104 |
| 0.211 | 0.256 | 6.104 |
| 0.203 | 0.245 | 6.104 |
| 0.194 | 0.235 | 6.104 |
| 0.185 | 0.225 | 6.104 |
| 0.177 | 0.215 | 6.104 |
| 0.168 | 0.204 | 6.104 |
| 0.159 | 0.194 | 6.104 |
| 0.150 | 0.184 | 6.104 |
| 0.141 | 0.174 | 6.104 |
| 0.132 | 0.165 | 6.104 |
| 0.123 | 0.155 | 6.104 |
| 0.113 | 0.145 | 6.104 |
| 0.104 | 0.135 | 6.104 |
| 0.095 | 0.126 | 6.104 |
| 0.085 | 0.116 | 6.104 |
| 0.075 | 0.107 | 6.104 |
| 0.066 | 0.098 | 6.104 |
| 0.056 | 0.089 | 6.104 |
| 0.046 | 0.079 | 6.104 |
| 0.036 | 0.071 | 6.104 |
| 0.026 | 0.062 | 6.104 |
| 0.015 | 0.053 | 6.104 |
| 0.005 | 0.045 | 6.104 |
| −0.005 | 0.036 | 6.104 |
| −0.016 | 0.028 | 6.104 |
| −0.027 | 0.020 | 6.104 |
| −0.038 | 0.012 | 6.104 |
| −0.049 | 0.005 | 6.104 |
| −0.060 | −0.003 | 6.104 |
| −0.071 | −0.010 | 6.104 |
| −0.083 | −0.017 | 6.104 |
| −0.094 | −0.024 | 6.104 |
| −0.106 | −0.031 | 6.104 |
| −0.118 | −0.037 | 6.104 |
| −0.130 | −0.043 | 6.104 |
| −0.142 | −0.049 | 6.104 |
| −0.154 | −0.054 | 6.104 |
| −0.167 | −0.059 | 6.104 |
| −0.179 | −0.064 | 6.104 |
| −0.192 | −0.069 | 6.104 |
| −0.205 | −0.073 | 6.104 |
| −0.217 | −0.077 | 6.104 |
| −0.230 | −0.080 | 6.104 |
| −0.243 | −0.084 | 6.104 |
| −0.257 | −0.086 | 6.104 |
| −0.270 | −0.089 | 6.104 |
| −0.283 | −0.091 | 6.104 |
| −0.296 | −0.093 | 6.104 |
| −0.310 | −0.094 | 6.104 |
| −0.323 | −0.095 | 6.104 |
| −0.337 | −0.095 | 6.104 |
| −0.339 | −0.095 | 6.104 |

TABLE 2-continued

|   | X | Y | Z |
|---|---|---|---|
|   | −0.342 | −0.095 | 6.104 |
|   | −0.345 | −0.095 | 6.104 |
|   | −0.347 | −0.096 | 6.104 |
|   | −0.350 | −0.096 | 6.104 |
|   | −0.353 | −0.096 | 6.104 |
|   | −0.355 | −0.095 | 6.104 |
|   | −0.358 | −0.095 | 6.104 |
|   | −0.361 | −0.095 | 6.104 |
|   | −0.363 | −0.095 | 6.104 |
|   | −0.373 | −0.096 | 6.104 |
|   | −0.383 | −0.097 | 6.104 |
|   | −0.392 | −0.099 | 6.104 |
|   | −0.401 | −0.102 | 6.104 |
|   | −0.410 | −0.107 | 6.104 |
|   | −0.418 | −0.112 | 6.104 |
|   | −0.425 | −0.119 | 6.104 |
|   | −0.431 | −0.126 | 6.104 |
|   | −0.436 | −0.135 | 6.104 |
|   | −0.439 | −0.144 | 6.104 |
|   | −0.441 | −0.153 | 6.104 |
|   | −0.442 | −0.163 | 6.104 |
|   | −0.441 | −0.172 | 6.104 |
|   | −0.438 | −0.182 | 6.104 |
|   | −0.435 | −0.191 | 6.104 |
|   | −0.430 | −0.199 | 6.104 |
|   | −0.424 | −0.207 | 6.104 |
|   | −0.417 | −0.214 | 6.104 |
| SECTION 5 | −0.405 | −0.239 | 6.254 |
|   | −0.402 | −0.240 | 6.254 |
|   | −0.399 | −0.242 | 6.254 |
|   | −0.397 | −0.243 | 6.254 |
|   | −0.394 | −0.245 | 6.254 |
|   | −0.391 | −0.246 | 6.254 |
|   | −0.388 | −0.248 | 6.254 |
|   | −0.385 | −0.249 | 6.254 |
|   | −0.382 | −0.251 | 6.254 |
|   | −0.379 | −0.252 | 6.254 |
|   | −0.376 | −0.253 | 6.254 |
|   | −0.361 | −0.259 | 6.254 |
|   | −0.346 | −0.264 | 6.254 |
|   | −0.330 | −0.267 | 6.254 |
|   | −0.314 | −0.270 | 6.254 |
|   | −0.298 | −0.271 | 6.254 |
|   | −0.282 | −0.272 | 6.254 |
|   | −0.266 | −0.272 | 6.254 |
|   | −0.250 | −0.271 | 6.254 |
|   | −0.234 | −0.269 | 6.254 |
|   | −0.218 | −0.266 | 6.254 |
|   | −0.202 | −0.263 | 6.254 |
|   | −0.187 | −0.259 | 6.254 |
|   | −0.172 | −0.254 | 6.254 |
|   | −0.157 | −0.248 | 6.254 |
|   | −0.142 | −0.242 | 6.254 |
|   | −0.127 | −0.235 | 6.254 |
|   | −0.113 | −0.228 | 6.254 |
|   | −0.099 | −0.220 | 6.254 |
|   | −0.085 | −0.212 | 6.254 |
|   | −0.071 | −0.203 | 6.254 |
|   | −0.058 | −0.194 | 6.254 |
|   | −0.045 | −0.184 | 6.254 |
|   | −0.032 | −0.175 | 6.254 |
|   | −0.019 | −0.165 | 6.254 |
|   | −0.007 | −0.154 | 6.254 |
|   | 0.005 | −0.144 | 6.254 |
|   | 0.017 | −0.133 | 6.254 |
|   | 0.029 | −0.122 | 6.254 |
|   | 0.041 | −0.111 | 6.254 |
|   | 0.052 | −0.100 | 6.254 |
|   | 0.063 | −0.088 | 6.254 |
|   | 0.074 | −0.077 | 6.254 |
|   | 0.085 | −0.065 | 6.254 |
|   | 0.096 | −0.053 | 6.254 |
|   | 0.107 | −0.041 | 6.254 |
|   | 0.117 | −0.029 | 6.254 |
|   | 0.128 | −0.016 | 6.254 |
|   | 0.138 | −0.004 | 6.254 |
|   | 0.148 | 0.009 | 6.254 |

TABLE 2-continued

|   | X | Y | Z |
|---|---|---|---|
|   | 0.158 | 0.021 | 6.254 |
|   | 0.168 | 0.034 | 6.254 |
|   | 0.178 | 0.047 | 6.254 |
|   | 0.187 | 0.060 | 6.254 |
|   | 0.197 | 0.073 | 6.254 |
|   | 0.206 | 0.086 | 6.254 |
|   | 0.216 | 0.099 | 6.254 |
|   | 0.225 | 0.112 | 6.254 |
|   | 0.234 | 0.125 | 6.254 |
|   | 0.243 | 0.139 | 6.254 |
|   | 0.252 | 0.152 | 6.254 |
|   | 0.260 | 0.166 | 6.254 |
|   | 0.269 | 0.179 | 6.254 |
|   | 0.278 | 0.193 | 6.254 |
|   | 0.286 | 0.207 | 6.254 |
|   | 0.294 | 0.220 | 6.254 |
|   | 0.303 | 0.234 | 6.254 |
|   | 0.311 | 0.248 | 6.254 |
|   | 0.319 | 0.262 | 6.254 |
|   | 0.326 | 0.276 | 6.254 |
|   | 0.334 | 0.290 | 6.254 |
|   | 0.342 | 0.305 | 6.254 |
|   | 0.349 | 0.319 | 6.254 |
|   | 0.357 | 0.333 | 6.254 |
|   | 0.364 | 0.347 | 6.254 |
|   | 0.371 | 0.362 | 6.254 |
|   | 0.378 | 0.376 | 6.254 |
|   | 0.385 | 0.391 | 6.254 |
|   | 0.392 | 0.406 | 6.254 |
|   | 0.399 | 0.420 | 6.254 |
|   | 0.405 | 0.435 | 6.254 |
|   | 0.412 | 0.450 | 6.254 |
|   | 0.418 | 0.464 | 6.254 |
|   | 0.424 | 0.479 | 6.254 |
|   | 0.431 | 0.494 | 6.254 |
|   | 0.437 | 0.509 | 6.254 |
|   | 0.443 | 0.524 | 6.254 |
|   | 0.449 | 0.539 | 6.254 |
|   | 0.454 | 0.554 | 6.254 |
|   | 0.460 | 0.569 | 6.254 |
|   | 0.461 | 0.572 | 6.254 |
|   | 0.462 | 0.575 | 6.254 |
|   | 0.464 | 0.578 | 6.254 |
|   | 0.465 | 0.581 | 6.254 |
|   | 0.466 | 0.584 | 6.254 |
|   | 0.467 | 0.587 | 6.254 |
|   | 0.468 | 0.590 | 6.254 |
|   | 0.469 | 0.593 | 6.254 |
|   | 0.470 | 0.596 | 6.254 |
|   | 0.472 | 0.599 | 6.254 |
|   | 0.472 | 0.601 | 6.254 |
|   | 0.472 | 0.602 | 6.254 |
|   | 0.472 | 0.604 | 6.254 |
|   | 0.472 | 0.606 | 6.254 |
|   | 0.471 | 0.608 | 6.254 |
|   | 0.470 | 0.609 | 6.254 |
|   | 0.469 | 0.611 | 6.254 |
|   | 0.468 | 0.612 | 6.254 |
|   | 0.467 | 0.613 | 6.254 |
|   | 0.465 | 0.614 | 6.254 |
|   | 0.464 | 0.614 | 6.254 |
|   | 0.462 | 0.615 | 6.254 |
|   | 0.460 | 0.615 | 6.254 |
|   | 0.458 | 0.614 | 6.254 |
|   | 0.457 | 0.614 | 6.254 |
|   | 0.455 | 0.613 | 6.254 |
|   | 0.454 | 0.612 | 6.254 |
|   | 0.452 | 0.611 | 6.254 |
|   | 0.451 | 0.610 | 6.254 |
|   | 0.450 | 0.608 | 6.254 |
|   | 0.448 | 0.605 | 6.254 |
|   | 0.447 | 0.603 | 6.254 |
|   | 0.445 | 0.601 | 6.254 |
|   | 0.443 | 0.599 | 6.254 |
|   | 0.442 | 0.596 | 6.254 |
|   | 0.440 | 0.594 | 6.254 |
|   | 0.439 | 0.592 | 6.254 |

TABLE 2-continued

| X | Y | Z |
|---|---|---|
| 0.437 | 0.590 | 6.254 |
| 0.436 | 0.588 | 6.254 |
| 0.428 | 0.576 | 6.254 |
| 0.420 | 0.565 | 6.254 |
| 0.412 | 0.554 | 6.254 |
| 0.404 | 0.543 | 6.254 |
| 0.397 | 0.532 | 6.254 |
| 0.389 | 0.521 | 6.254 |
| 0.381 | 0.510 | 6.254 |
| 0.373 | 0.498 | 6.254 |
| 0.365 | 0.487 | 6.254 |
| 0.357 | 0.476 | 6.254 |
| 0.350 | 0.465 | 6.254 |
| 0.342 | 0.454 | 6.254 |
| 0.334 | 0.443 | 6.254 |
| 0.326 | 0.432 | 6.254 |
| 0.318 | 0.421 | 6.254 |
| 0.310 | 0.410 | 6.254 |
| 0.302 | 0.399 | 6.254 |
| 0.294 | 0.388 | 6.254 |
| 0.286 | 0.377 | 6.254 |
| 0.278 | 0.366 | 6.254 |
| 0.270 | 0.355 | 6.254 |
| 0.262 | 0.344 | 6.254 |
| 0.254 | 0.333 | 6.254 |
| 0.245 | 0.322 | 6.254 |
| 0.237 | 0.312 | 6.254 |
| 0.229 | 0.301 | 6.254 |
| 0.221 | 0.290 | 6.254 |
| 0.212 | 0.279 | 6.254 |
| 0.204 | 0.269 | 6.254 |
| 0.195 | 0.258 | 6.254 |
| 0.187 | 0.247 | 6.254 |
| 0.178 | 0.237 | 6.254 |
| 0.170 | 0.226 | 6.254 |
| 0.161 | 0.216 | 6.254 |
| 0.152 | 0.205 | 6.254 |
| 0.144 | 0.195 | 6.254 |
| 0.135 | 0.185 | 6.254 |
| 0.126 | 0.174 | 6.254 |
| 0.117 | 0.164 | 6.254 |
| 0.108 | 0.154 | 6.254 |
| 0.099 | 0.144 | 6.254 |
| 0.089 | 0.134 | 6.254 |
| 0.080 | 0.124 | 6.254 |
| 0.071 | 0.114 | 6.254 |
| 0.061 | 0.105 | 6.254 |
| 0.051 | 0.095 | 6.254 |
| 0.042 | 0.086 | 6.254 |
| 0.032 | 0.076 | 6.254 |
| 0.022 | 0.067 | 6.254 |
| 0.012 | 0.058 | 6.254 |
| 0.002 | 0.049 | 6.254 |
| −0.009 | 0.040 | 6.254 |
| −0.019 | 0.031 | 6.254 |
| −0.030 | 0.023 | 6.254 |
| −0.041 | 0.014 | 6.254 |
| −0.051 | 0.006 | 6.254 |
| −0.062 | −0.002 | 6.254 |
| −0.074 | −0.010 | 6.254 |
| −0.085 | −0.017 | 6.254 |
| −0.096 | −0.025 | 6.254 |
| −0.108 | −0.032 | 6.254 |
| −0.120 | −0.039 | 6.254 |
| −0.131 | −0.045 | 6.254 |
| −0.143 | −0.052 | 6.254 |
| −0.156 | −0.058 | 6.254 |
| −0.168 | −0.063 | 6.254 |
| −0.180 | −0.069 | 6.254 |
| −0.193 | −0.074 | 6.254 |
| −0.206 | −0.078 | 6.254 |
| −0.219 | −0.083 | 6.254 |
| −0.232 | −0.087 | 6.254 |
| −0.245 | −0.090 | 6.254 |
| −0.258 | −0.094 | 6.254 |
| −0.271 | −0.096 | 6.254 |
| −0.285 | −0.099 | 6.254 |

TABLE 2-continued

| | X | Y | Z |
|---|---|---|---|
| | −0.298 | −0.101 | 6.254 |
| | −0.312 | −0.102 | 6.254 |
| | −0.325 | −0.104 | 6.254 |
| | −0.339 | −0.104 | 6.254 |
| | −0.342 | −0.104 | 6.254 |
| | −0.344 | −0.104 | 6.254 |
| | −0.347 | −0.105 | 6.254 |
| | −0.350 | −0.105 | 6.254 |
| | −0.352 | −0.105 | 6.254 |
| | −0.355 | −0.105 | 6.254 |
| | −0.358 | −0.105 | 6.254 |
| | −0.361 | −0.105 | 6.254 |
| | −0.363 | −0.105 | 6.254 |
| | −0.366 | −0.104 | 6.254 |
| | −0.377 | −0.105 | 6.254 |
| | −0.387 | −0.106 | 6.254 |
| | −0.397 | −0.109 | 6.254 |
| | −0.407 | −0.113 | 6.254 |
| | −0.416 | −0.118 | 6.254 |
| | −0.425 | −0.124 | 6.254 |
| | −0.432 | −0.132 | 6.254 |
| | −0.439 | −0.140 | 6.254 |
| | −0.443 | −0.150 | 6.254 |
| | −0.446 | −0.160 | 6.254 |
| | −0.448 | −0.170 | 6.254 |
| | −0.447 | −0.181 | 6.254 |
| | −0.445 | −0.191 | 6.254 |
| | −0.441 | −0.201 | 6.254 |
| | −0.436 | −0.210 | 6.254 |
| | −0.429 | −0.219 | 6.254 |
| | −0.422 | −0.226 | 6.254 |
| | −0.414 | −0.233 | 6.254 |
| SECTION 6 | −0.399 | −0.247 | 6.404 |
| | −0.396 | −0.249 | 6.404 |
| | −0.393 | −0.250 | 6.404 |
| | −0.390 | −0.251 | 6.404 |
| | −0.387 | −0.253 | 6.404 |
| | −0.384 | −0.254 | 6.404 |
| | −0.381 | −0.255 | 6.404 |
| | −0.378 | −0.256 | 6.404 |
| | −0.375 | −0.257 | 6.404 |
| | −0.372 | −0.258 | 6.404 |
| | −0.369 | −0.260 | 6.404 |
| | −0.354 | −0.264 | 6.404 |
| | −0.338 | −0.268 | 6.404 |
| | −0.322 | −0.271 | 6.404 |
| | −0.306 | −0.272 | 6.404 |
| | −0.290 | −0.273 | 6.404 |
| | −0.274 | −0.273 | 6.404 |
| | −0.258 | −0.272 | 6.404 |
| | −0.242 | −0.270 | 6.404 |
| | −0.226 | −0.268 | 6.404 |
| | −0.210 | −0.265 | 6.404 |
| | −0.195 | −0.261 | 6.404 |
| | −0.179 | −0.256 | 6.404 |
| | −0.164 | −0.250 | 6.404 |
| | −0.149 | −0.244 | 6.404 |
| | −0.135 | −0.238 | 6.404 |
| | −0.120 | −0.231 | 6.404 |
| | −0.106 | −0.223 | 6.404 |
| | −0.092 | −0.215 | 6.404 |
| | −0.079 | −0.206 | 6.404 |
| | −0.065 | −0.197 | 6.404 |
| | −0.052 | −0.188 | 6.404 |
| | −0.039 | −0.178 | 6.404 |
| | −0.027 | −0.168 | 6.404 |
| | −0.015 | −0.158 | 6.404 |
| | −0.002 | −0.147 | 6.404 |
| | 0.010 | −0.136 | 6.404 |
| | 0.021 | −0.125 | 6.404 |
| | 0.033 | −0.114 | 6.404 |
| | 0.044 | −0.103 | 6.404 |
| | 0.055 | −0.091 | 6.404 |
| | 0.066 | −0.079 | 6.404 |
| | 0.077 | −0.067 | 6.404 |
| | 0.088 | −0.055 | 6.404 |
| | 0.098 | −0.043 | 6.404 |

TABLE 2-continued

| X | Y | Z |
|---|---|---|
| 0.109 | −0.031 | 6.404 |
| 0.119 | −0.018 | 6.404 |
| 0.129 | −0.006 | 6.404 |
| 0.139 | 0.007 | 6.404 |
| 0.149 | 0.019 | 6.404 |
| 0.159 | 0.032 | 6.404 |
| 0.168 | 0.045 | 6.404 |
| 0.178 | 0.058 | 6.404 |
| 0.187 | 0.071 | 6.404 |
| 0.196 | 0.085 | 6.404 |
| 0.205 | 0.098 | 6.404 |
| 0.214 | 0.111 | 6.404 |
| 0.223 | 0.125 | 6.404 |
| 0.232 | 0.138 | 6.404 |
| 0.240 | 0.152 | 6.404 |
| 0.249 | 0.166 | 6.404 |
| 0.257 | 0.179 | 6.404 |
| 0.265 | 0.193 | 6.404 |
| 0.273 | 0.207 | 6.404 |
| 0.281 | 0.221 | 6.404 |
| 0.289 | 0.235 | 6.404 |
| 0.297 | 0.249 | 6.404 |
| 0.305 | 0.263 | 6.404 |
| 0.313 | 0.277 | 6.404 |
| 0.320 | 0.292 | 6.404 |
| 0.327 | 0.306 | 6.404 |
| 0.335 | 0.320 | 6.404 |
| 0.342 | 0.335 | 6.404 |
| 0.349 | 0.349 | 6.404 |
| 0.356 | 0.364 | 6.404 |
| 0.363 | 0.378 | 6.404 |
| 0.369 | 0.393 | 6.404 |
| 0.376 | 0.407 | 6.404 |
| 0.382 | 0.422 | 6.404 |
| 0.389 | 0.437 | 6.404 |
| 0.395 | 0.452 | 6.404 |
| 0.401 | 0.467 | 6.404 |
| 0.407 | 0.481 | 6.404 |
| 0.413 | 0.496 | 6.404 |
| 0.419 | 0.511 | 6.404 |
| 0.425 | 0.526 | 6.404 |
| 0.431 | 0.541 | 6.404 |
| 0.436 | 0.556 | 6.404 |
| 0.442 | 0.572 | 6.404 |
| 0.448 | 0.587 | 6.404 |
| 0.449 | 0.590 | 6.404 |
| 0.450 | 0.593 | 6.404 |
| 0.451 | 0.596 | 6.404 |
| 0.452 | 0.599 | 6.404 |
| 0.453 | 0.602 | 6.404 |
| 0.454 | 0.605 | 6.404 |
| 0.455 | 0.608 | 6.404 |
| 0.456 | 0.611 | 6.404 |
| 0.457 | 0.614 | 6.404 |
| 0.458 | 0.617 | 6.404 |
| 0.459 | 0.619 | 6.404 |
| 0.459 | 0.620 | 6.404 |
| 0.459 | 0.622 | 6.404 |
| 0.459 | 0.624 | 6.404 |
| 0.458 | 0.625 | 6.404 |
| 0.457 | 0.627 | 6.404 |
| 0.456 | 0.628 | 6.404 |
| 0.455 | 0.630 | 6.404 |
| 0.454 | 0.631 | 6.404 |
| 0.452 | 0.631 | 6.404 |
| 0.450 | 0.632 | 6.404 |
| 0.449 | 0.632 | 6.404 |
| 0.447 | 0.632 | 6.404 |
| 0.445 | 0.632 | 6.404 |
| 0.443 | 0.632 | 6.404 |
| 0.442 | 0.631 | 6.404 |
| 0.440 | 0.630 | 6.404 |
| 0.439 | 0.629 | 6.404 |
| 0.438 | 0.627 | 6.404 |
| 0.436 | 0.625 | 6.404 |
| 0.435 | 0.623 | 6.404 |
| 0.433 | 0.621 | 6.404 |
| 0.432 | 0.618 | 6.404 |
| 0.430 | 0.616 | 6.404 |
| 0.429 | 0.614 | 6.404 |
| 0.427 | 0.612 | 6.404 |
| 0.426 | 0.609 | 6.404 |
| 0.424 | 0.607 | 6.404 |
| 0.423 | 0.605 | 6.404 |
| 0.415 | 0.594 | 6.404 |
| 0.407 | 0.582 | 6.404 |
| 0.400 | 0.571 | 6.404 |
| 0.392 | 0.560 | 6.404 |
| 0.384 | 0.549 | 6.404 |
| 0.377 | 0.537 | 6.404 |
| 0.369 | 0.526 | 6.404 |
| 0.361 | 0.515 | 6.404 |
| 0.353 | 0.504 | 6.404 |
| 0.346 | 0.493 | 6.404 |
| 0.338 | 0.481 | 6.404 |
| 0.330 | 0.470 | 6.404 |
| 0.322 | 0.459 | 6.404 |
| 0.315 | 0.448 | 6.404 |
| 0.307 | 0.437 | 6.404 |
| 0.299 | 0.425 | 6.404 |
| 0.291 | 0.414 | 6.404 |
| 0.283 | 0.403 | 6.404 |
| 0.276 | 0.392 | 6.404 |
| 0.268 | 0.381 | 6.404 |
| 0.260 | 0.370 | 6.404 |
| 0.252 | 0.359 | 6.404 |
| 0.244 | 0.348 | 6.404 |
| 0.236 | 0.337 | 6.404 |
| 0.228 | 0.326 | 6.404 |
| 0.220 | 0.315 | 6.404 |
| 0.212 | 0.304 | 6.404 |
| 0.203 | 0.293 | 6.404 |
| 0.195 | 0.282 | 6.404 |
| 0.187 | 0.271 | 6.404 |
| 0.179 | 0.260 | 6.404 |
| 0.170 | 0.250 | 6.404 |
| 0.162 | 0.239 | 6.404 |
| 0.154 | 0.228 | 6.404 |
| 0.145 | 0.217 | 6.404 |
| 0.137 | 0.207 | 6.404 |
| 0.128 | 0.196 | 6.404 |
| 0.119 | 0.186 | 6.404 |
| 0.111 | 0.175 | 6.404 |
| 0.102 | 0.165 | 6.404 |
| 0.093 | 0.155 | 6.404 |
| 0.084 | 0.144 | 6.404 |
| 0.075 | 0.134 | 6.404 |
| 0.066 | 0.124 | 6.404 |
| 0.056 | 0.114 | 6.404 |
| 0.047 | 0.104 | 6.404 |
| 0.038 | 0.095 | 6.404 |
| 0.028 | 0.085 | 6.404 |
| 0.018 | 0.075 | 6.404 |
| 0.009 | 0.066 | 6.404 |
| −0.001 | 0.056 | 6.404 |
| −0.011 | 0.047 | 6.404 |
| −0.022 | 0.038 | 6.404 |
| −0.032 | 0.029 | 6.404 |
| −0.042 | 0.020 | 6.404 |
| −0.053 | 0.012 | 6.404 |
| −0.064 | 0.003 | 6.404 |
| −0.074 | −0.005 | 6.404 |
| −0.085 | −0.013 | 6.404 |
| −0.097 | −0.021 | 6.404 |
| −0.108 | −0.028 | 6.404 |
| −0.119 | −0.036 | 6.404 |
| −0.131 | −0.043 | 6.404 |
| −0.143 | −0.049 | 6.404 |
| −0.155 | −0.056 | 6.404 |
| −0.167 | −0.062 | 6.404 |
| −0.179 | −0.068 | 6.404 |
| −0.192 | −0.074 | 6.404 |
| −0.204 | −0.079 | 6.404 |
| −0.217 | −0.084 | 6.404 |

TABLE 2-continued

|  | X | Y | Z |
|---|---|---|---|
|  | −0.230 | −0.088 | 6.404 |
|  | −0.243 | −0.092 | 6.404 |
|  | −0.256 | −0.096 | 6.404 |
|  | −0.269 | −0.099 | 6.404 |
|  | −0.282 | −0.102 | 6.404 |
|  | −0.296 | −0.104 | 6.404 |
|  | −0.309 | −0.106 | 6.404 |
|  | −0.323 | −0.107 | 6.404 |
|  | −0.337 | −0.108 | 6.404 |
|  | −0.339 | −0.108 | 6.404 |
|  | −0.342 | −0.108 | 6.404 |
|  | −0.345 | −0.108 | 6.404 |
|  | −0.347 | −0.108 | 6.404 |
|  | −0.350 | −0.108 | 6.404 |
|  | −0.353 | −0.108 | 6.404 |
|  | −0.356 | −0.108 | 6.404 |
|  | −0.358 | −0.108 | 6.404 |
|  | −0.361 | −0.108 | 6.404 |
|  | −0.364 | −0.108 | 6.404 |
|  | −0.375 | −0.109 | 6.404 |
|  | −0.386 | −0.110 | 6.404 |
|  | −0.396 | −0.113 | 6.404 |
|  | −0.407 | −0.117 | 6.404 |
|  | −0.416 | −0.123 | 6.404 |
|  | −0.425 | −0.129 | 6.404 |
|  | −0.433 | −0.137 | 6.404 |
|  | −0.439 | −0.147 | 6.404 |
|  | −0.443 | −0.157 | 6.404 |
|  | −0.446 | −0.167 | 6.404 |
|  | −0.447 | −0.178 | 6.404 |
|  | −0.446 | −0.189 | 6.404 |
|  | −0.443 | −0.200 | 6.404 |
|  | −0.438 | −0.210 | 6.404 |
|  | −0.432 | −0.219 | 6.404 |
|  | −0.425 | −0.228 | 6.404 |
|  | −0.417 | −0.235 | 6.404 |
|  | −0.408 | −0.242 | 6.404 |
| SECTION 7 | −0.391 | −0.244 | 6.554 |
|  | −0.388 | −0.245 | 6.554 |
|  | −0.385 | −0.247 | 6.554 |
|  | −0.382 | −0.248 | 6.554 |
|  | −0.379 | −0.249 | 6.554 |
|  | −0.376 | −0.251 | 6.554 |
|  | −0.373 | −0.252 | 6.554 |
|  | −0.370 | −0.253 | 6.554 |
|  | −0.367 | −0.254 | 6.554 |
|  | −0.364 | −0.255 | 6.554 |
|  | −0.361 | −0.256 | 6.554 |
|  | −0.346 | −0.261 | 6.554 |
|  | −0.331 | −0.265 | 6.554 |
|  | −0.315 | −0.268 | 6.554 |
|  | −0.299 | −0.270 | 6.554 |
|  | −0.283 | −0.271 | 6.554 |
|  | −0.267 | −0.271 | 6.554 |
|  | −0.251 | −0.270 | 6.554 |
|  | −0.235 | −0.268 | 6.554 |
|  | −0.219 | −0.265 | 6.554 |
|  | −0.203 | −0.262 | 6.554 |
|  | −0.188 | −0.258 | 6.554 |
|  | −0.173 | −0.253 | 6.554 |
|  | −0.158 | −0.247 | 6.554 |
|  | −0.143 | −0.241 | 6.554 |
|  | −0.128 | −0.234 | 6.554 |
|  | −0.114 | −0.227 | 6.554 |
|  | −0.100 | −0.219 | 6.554 |
|  | −0.086 | −0.211 | 6.554 |
|  | −0.073 | −0.202 | 6.554 |
|  | −0.060 | −0.193 | 6.554 |
|  | −0.047 | −0.183 | 6.554 |
|  | −0.034 | −0.173 | 6.554 |
|  | −0.022 | −0.163 | 6.554 |
|  | −0.010 | −0.153 | 6.554 |
|  | 0.002 | −0.142 | 6.554 |
|  | 0.014 | −0.131 | 6.554 |
|  | 0.025 | −0.120 | 6.554 |
|  | 0.036 | −0.108 | 6.554 |
|  | 0.047 | −0.097 | 6.554 |
|  | 0.058 | −0.085 | 6.554 |
|  | 0.069 | −0.073 | 6.554 |
|  | 0.079 | −0.061 | 6.554 |
|  | 0.090 | −0.049 | 6.554 |
|  | 0.100 | −0.036 | 6.554 |
|  | 0.110 | −0.024 | 6.554 |
|  | 0.120 | −0.011 | 6.554 |
|  | 0.129 | 0.002 | 6.554 |
|  | 0.139 | 0.015 | 6.554 |
|  | 0.148 | 0.028 | 6.554 |
|  | 0.158 | 0.041 | 6.554 |
|  | 0.167 | 0.054 | 6.554 |
|  | 0.176 | 0.067 | 6.554 |
|  | 0.185 | 0.080 | 6.554 |
|  | 0.193 | 0.094 | 6.554 |
|  | 0.202 | 0.107 | 6.554 |
|  | 0.211 | 0.121 | 6.554 |
|  | 0.219 | 0.135 | 6.554 |
|  | 0.227 | 0.148 | 6.554 |
|  | 0.235 | 0.162 | 6.554 |
|  | 0.243 | 0.176 | 6.554 |
|  | 0.251 | 0.190 | 6.554 |
|  | 0.259 | 0.204 | 6.554 |
|  | 0.267 | 0.218 | 6.554 |
|  | 0.274 | 0.232 | 6.554 |
|  | 0.282 | 0.246 | 6.554 |
|  | 0.289 | 0.261 | 6.554 |
|  | 0.296 | 0.275 | 6.554 |
|  | 0.304 | 0.289 | 6.554 |
|  | 0.311 | 0.304 | 6.554 |
|  | 0.317 | 0.318 | 6.554 |
|  | 0.324 | 0.333 | 6.554 |
|  | 0.331 | 0.347 | 6.554 |
|  | 0.338 | 0.362 | 6.554 |
|  | 0.344 | 0.376 | 6.554 |
|  | 0.350 | 0.391 | 6.554 |
|  | 0.357 | 0.406 | 6.554 |
|  | 0.363 | 0.421 | 6.554 |
|  | 0.369 | 0.436 | 6.554 |
|  | 0.375 | 0.450 | 6.554 |
|  | 0.381 | 0.465 | 6.554 |
|  | 0.387 | 0.480 | 6.554 |
|  | 0.393 | 0.495 | 6.554 |
|  | 0.398 | 0.510 | 6.554 |
|  | 0.404 | 0.525 | 6.554 |
|  | 0.409 | 0.540 | 6.554 |
|  | 0.415 | 0.555 | 6.554 |
|  | 0.420 | 0.570 | 6.554 |
|  | 0.425 | 0.586 | 6.554 |
|  | 0.431 | 0.601 | 6.554 |
|  | 0.432 | 0.604 | 6.554 |
|  | 0.433 | 0.607 | 6.554 |
|  | 0.434 | 0.610 | 6.554 |
|  | 0.435 | 0.613 | 6.554 |
|  | 0.436 | 0.616 | 6.554 |
|  | 0.437 | 0.619 | 6.554 |
|  | 0.438 | 0.622 | 6.554 |
|  | 0.439 | 0.625 | 6.554 |
|  | 0.440 | 0.628 | 6.554 |
|  | 0.441 | 0.631 | 6.554 |
|  | 0.442 | 0.633 | 6.554 |
|  | 0.442 | 0.634 | 6.554 |
|  | 0.442 | 0.636 | 6.554 |
|  | 0.441 | 0.638 | 6.554 |
|  | 0.441 | 0.640 | 6.554 |
|  | 0.440 | 0.641 | 6.554 |
|  | 0.439 | 0.642 | 6.554 |
|  | 0.437 | 0.644 | 6.554 |
|  | 0.436 | 0.645 | 6.554 |
|  | 0.434 | 0.645 | 6.554 |
|  | 0.433 | 0.646 | 6.554 |
|  | 0.431 | 0.646 | 6.554 |
|  | 0.429 | 0.646 | 6.554 |
|  | 0.428 | 0.646 | 6.554 |
|  | 0.426 | 0.645 | 6.554 |
|  | 0.424 | 0.645 | 6.554 |
|  | 0.423 | 0.644 | 6.554 |

TABLE 2-continued

| X | Y | Z |
|---|---|---|
| 0.422 | 0.643 | 6.554 |
| 0.420 | 0.641 | 6.554 |
| 0.419 | 0.639 | 6.554 |
| 0.417 | 0.637 | 6.554 |
| 0.416 | 0.634 | 6.554 |
| 0.414 | 0.632 | 6.554 |
| 0.413 | 0.630 | 6.554 |
| 0.411 | 0.628 | 6.554 |
| 0.410 | 0.625 | 6.554 |
| 0.409 | 0.623 | 6.554 |
| 0.407 | 0.621 | 6.554 |
| 0.406 | 0.619 | 6.554 |
| 0.398 | 0.608 | 6.554 |
| 0.391 | 0.596 | 6.554 |
| 0.383 | 0.585 | 6.554 |
| 0.376 | 0.574 | 6.554 |
| 0.368 | 0.563 | 6.554 |
| 0.361 | 0.552 | 6.554 |
| 0.353 | 0.540 | 6.554 |
| 0.346 | 0.529 | 6.554 |
| 0.338 | 0.518 | 6.554 |
| 0.331 | 0.507 | 6.554 |
| 0.323 | 0.496 | 6.554 |
| 0.316 | 0.484 | 6.554 |
| 0.308 | 0.473 | 6.554 |
| 0.301 | 0.462 | 6.554 |
| 0.293 | 0.451 | 6.554 |
| 0.286 | 0.440 | 6.554 |
| 0.278 | 0.429 | 6.554 |
| 0.271 | 0.418 | 6.554 |
| 0.263 | 0.406 | 6.554 |
| 0.255 | 0.395 | 6.554 |
| 0.248 | 0.384 | 6.554 |
| 0.240 | 0.373 | 6.554 |
| 0.232 | 0.362 | 6.554 |
| 0.225 | 0.351 | 6.554 |
| 0.217 | 0.340 | 6.554 |
| 0.209 | 0.329 | 6.554 |
| 0.201 | 0.318 | 6.554 |
| 0.193 | 0.307 | 6.554 |
| 0.185 | 0.296 | 6.554 |
| 0.178 | 0.286 | 6.554 |
| 0.170 | 0.275 | 6.554 |
| 0.162 | 0.264 | 6.554 |
| 0.154 | 0.253 | 6.554 |
| 0.145 | 0.242 | 6.554 |
| 0.137 | 0.232 | 6.554 |
| 0.129 | 0.221 | 6.554 |
| 0.121 | 0.210 | 6.554 |
| 0.112 | 0.200 | 6.554 |
| 0.104 | 0.189 | 6.554 |
| 0.096 | 0.179 | 6.554 |
| 0.087 | 0.168 | 6.554 |
| 0.078 | 0.158 | 6.554 |
| 0.070 | 0.148 | 6.554 |
| 0.061 | 0.138 | 6.554 |
| 0.052 | 0.128 | 6.554 |
| 0.043 | 0.117 | 6.554 |
| 0.034 | 0.108 | 6.554 |
| 0.025 | 0.098 | 6.554 |
| 0.016 | 0.088 | 6.554 |
| 0.006 | 0.078 | 6.554 |
| −0.003 | 0.069 | 6.554 |
| −0.013 | 0.059 | 6.554 |
| −0.023 | 0.050 | 6.554 |
| −0.033 | 0.041 | 6.554 |
| −0.043 | 0.032 | 6.554 |
| −0.053 | 0.023 | 6.554 |
| −0.063 | 0.014 | 6.554 |
| −0.073 | 0.006 | 6.554 |
| −0.084 | −0.003 | 6.554 |
| −0.095 | −0.011 | 6.554 |
| −0.105 | −0.019 | 6.554 |
| −0.117 | −0.026 | 6.554 |
| −0.128 | −0.034 | 6.554 |
| −0.139 | −0.041 | 6.554 |
| −0.151 | −0.048 | 6.554 |

TABLE 2-continued

| | X | Y | Z |
|---|---|---|---|
| | −0.162 | −0.055 | 6.554 |
| | −0.174 | −0.061 | 6.554 |
| | −0.186 | −0.067 | 6.554 |
| | −0.199 | −0.072 | 6.554 |
| | −0.211 | −0.078 | 6.554 |
| | −0.224 | −0.083 | 6.554 |
| | −0.236 | −0.087 | 6.554 |
| | −0.249 | −0.091 | 6.554 |
| | −0.262 | −0.094 | 6.554 |
| | −0.275 | −0.098 | 6.554 |
| | −0.288 | −0.100 | 6.554 |
| | −0.302 | −0.102 | 6.554 |
| | −0.315 | −0.104 | 6.554 |
| | −0.329 | −0.105 | 6.554 |
| | −0.331 | −0.105 | 6.554 |
| | −0.334 | −0.105 | 6.554 |
| | −0.337 | −0.105 | 6.554 |
| | −0.339 | −0.105 | 6.554 |
| | −0.342 | −0.105 | 6.554 |
| | −0.345 | −0.105 | 6.554 |
| | −0.347 | −0.105 | 6.554 |
| | −0.350 | −0.105 | 6.554 |
| | −0.353 | −0.105 | 6.554 |
| | −0.355 | −0.105 | 6.554 |
| | −0.366 | −0.106 | 6.554 |
| | −0.377 | −0.107 | 6.554 |
| | −0.388 | −0.110 | 6.554 |
| | −0.398 | −0.114 | 6.554 |
| | −0.407 | −0.120 | 6.554 |
| | −0.416 | −0.126 | 6.554 |
| | −0.424 | −0.134 | 6.554 |
| | −0.430 | −0.143 | 6.554 |
| | −0.434 | −0.153 | 6.554 |
| | −0.437 | −0.164 | 6.554 |
| | −0.438 | −0.175 | 6.554 |
| | −0.437 | −0.186 | 6.554 |
| | −0.434 | −0.196 | 6.554 |
| | −0.430 | −0.206 | 6.554 |
| | −0.424 | −0.216 | 6.554 |
| | −0.417 | −0.224 | 6.554 |
| | −0.409 | −0.232 | 6.554 |
| | −0.400 | −0.238 | 6.554 |
| SECTION 8 | −0.382 | −0.231 | 6.700 |
| | −0.379 | −0.233 | 6.700 |
| | −0.377 | −0.234 | 6.700 |
| | −0.374 | −0.236 | 6.700 |
| | −0.371 | −0.237 | 6.700 |
| | −0.368 | −0.239 | 6.700 |
| | −0.366 | −0.240 | 6.700 |
| | −0.363 | −0.242 | 6.700 |
| | −0.360 | −0.243 | 6.700 |
| | −0.357 | −0.245 | 6.700 |
| | −0.354 | −0.246 | 6.700 |
| | −0.339 | −0.252 | 6.700 |
| | −0.324 | −0.257 | 6.700 |
| | −0.309 | −0.260 | 6.700 |
| | −0.293 | −0.263 | 6.700 |
| | −0.277 | −0.265 | 6.700 |
| | −0.261 | −0.265 | 6.700 |
| | −0.245 | −0.265 | 6.700 |
| | −0.229 | −0.264 | 6.700 |
| | −0.213 | −0.261 | 6.700 |
| | −0.198 | −0.258 | 6.700 |
| | −0.182 | −0.254 | 6.700 |
| | −0.167 | −0.250 | 6.700 |
| | −0.152 | −0.244 | 6.700 |
| | −0.137 | −0.238 | 6.700 |
| | −0.123 | −0.232 | 6.700 |
| | −0.109 | −0.224 | 6.700 |
| | −0.095 | −0.217 | 6.700 |
| | −0.081 | −0.208 | 6.700 |
| | −0.068 | −0.199 | 6.700 |
| | −0.055 | −0.190 | 6.700 |
| | −0.043 | −0.180 | 6.700 |
| | −0.030 | −0.170 | 6.700 |
| | −0.018 | −0.160 | 6.700 |
| | −0.006 | −0.150 | 6.700 |

TABLE 2-continued

| X | Y | Z |
|---|---|---|
| 0.006 | −0.139 | 6.700 |
| 0.017 | −0.128 | 6.700 |
| 0.028 | −0.116 | 6.700 |
| 0.039 | −0.105 | 6.700 |
| 0.050 | −0.093 | 6.700 |
| 0.060 | −0.081 | 6.700 |
| 0.071 | −0.069 | 6.700 |
| 0.081 | −0.057 | 6.700 |
| 0.091 | −0.044 | 6.700 |
| 0.101 | −0.032 | 6.700 |
| 0.110 | −0.019 | 6.700 |
| 0.120 | −0.006 | 6.700 |
| 0.129 | 0.007 | 6.700 |
| 0.138 | 0.020 | 6.700 |
| 0.147 | 0.033 | 6.700 |
| 0.156 | 0.046 | 6.700 |
| 0.165 | 0.060 | 6.700 |
| 0.173 | 0.073 | 6.700 |
| 0.181 | 0.087 | 6.700 |
| 0.190 | 0.100 | 6.700 |
| 0.198 | 0.114 | 6.700 |
| 0.206 | 0.128 | 6.700 |
| 0.214 | 0.142 | 6.700 |
| 0.221 | 0.156 | 6.700 |
| 0.229 | 0.170 | 6.700 |
| 0.236 | 0.184 | 6.700 |
| 0.244 | 0.198 | 6.700 |
| 0.251 | 0.212 | 6.700 |
| 0.258 | 0.226 | 6.700 |
| 0.265 | 0.241 | 6.700 |
| 0.272 | 0.255 | 6.700 |
| 0.279 | 0.269 | 6.700 |
| 0.286 | 0.284 | 6.700 |
| 0.292 | 0.298 | 6.700 |
| 0.299 | 0.313 | 6.700 |
| 0.305 | 0.328 | 6.700 |
| 0.311 | 0.342 | 6.700 |
| 0.318 | 0.357 | 6.700 |
| 0.324 | 0.372 | 6.700 |
| 0.330 | 0.386 | 6.700 |
| 0.336 | 0.401 | 6.700 |
| 0.342 | 0.416 | 6.700 |
| 0.347 | 0.431 | 6.700 |
| 0.353 | 0.446 | 6.700 |
| 0.358 | 0.461 | 6.700 |
| 0.364 | 0.476 | 6.700 |
| 0.369 | 0.491 | 6.700 |
| 0.375 | 0.506 | 6.700 |
| 0.380 | 0.521 | 6.700 |
| 0.385 | 0.536 | 6.700 |
| 0.390 | 0.551 | 6.700 |
| 0.396 | 0.566 | 6.700 |
| 0.401 | 0.581 | 6.700 |
| 0.406 | 0.596 | 6.700 |
| 0.411 | 0.611 | 6.700 |
| 0.412 | 0.614 | 6.700 |
| 0.413 | 0.617 | 6.700 |
| 0.414 | 0.620 | 6.700 |
| 0.415 | 0.623 | 6.700 |
| 0.416 | 0.626 | 6.700 |
| 0.417 | 0.629 | 6.700 |
| 0.418 | 0.632 | 6.700 |
| 0.419 | 0.635 | 6.700 |
| 0.420 | 0.638 | 6.700 |
| 0.421 | 0.641 | 6.700 |
| 0.421 | 0.643 | 6.700 |
| 0.421 | 0.645 | 6.700 |
| 0.421 | 0.647 | 6.700 |
| 0.421 | 0.648 | 6.700 |
| 0.420 | 0.650 | 6.700 |
| 0.419 | 0.651 | 6.700 |
| 0.418 | 0.653 | 6.700 |
| 0.417 | 0.654 | 6.700 |
| 0.415 | 0.655 | 6.700 |
| 0.414 | 0.656 | 6.700 |
| 0.412 | 0.656 | 6.700 |
| 0.410 | 0.656 | 6.700 |
| 0.408 | 0.656 | 6.700 |
| 0.407 | 0.656 | 6.700 |
| 0.405 | 0.656 | 6.700 |
| 0.403 | 0.655 | 6.700 |
| 0.402 | 0.654 | 6.700 |
| 0.401 | 0.653 | 6.700 |
| 0.400 | 0.651 | 6.700 |
| 0.398 | 0.649 | 6.700 |
| 0.397 | 0.647 | 6.700 |
| 0.395 | 0.645 | 6.700 |
| 0.394 | 0.642 | 6.700 |
| 0.393 | 0.640 | 6.700 |
| 0.391 | 0.638 | 6.700 |
| 0.390 | 0.636 | 6.700 |
| 0.388 | 0.634 | 6.700 |
| 0.387 | 0.631 | 6.700 |
| 0.385 | 0.629 | 6.700 |
| 0.378 | 0.618 | 6.700 |
| 0.371 | 0.607 | 6.700 |
| 0.364 | 0.596 | 6.700 |
| 0.357 | 0.585 | 6.700 |
| 0.350 | 0.574 | 6.700 |
| 0.342 | 0.563 | 6.700 |
| 0.335 | 0.552 | 6.700 |
| 0.328 | 0.541 | 6.700 |
| 0.321 | 0.530 | 6.700 |
| 0.314 | 0.519 | 6.700 |
| 0.306 | 0.508 | 6.700 |
| 0.299 | 0.497 | 6.700 |
| 0.292 | 0.486 | 6.700 |
| 0.285 | 0.475 | 6.700 |
| 0.278 | 0.464 | 6.700 |
| 0.270 | 0.453 | 6.700 |
| 0.263 | 0.442 | 6.700 |
| 0.256 | 0.431 | 6.700 |
| 0.249 | 0.420 | 6.700 |
| 0.241 | 0.409 | 6.700 |
| 0.234 | 0.398 | 6.700 |
| 0.227 | 0.387 | 6.700 |
| 0.219 | 0.376 | 6.700 |
| 0.212 | 0.365 | 6.700 |
| 0.205 | 0.354 | 6.700 |
| 0.197 | 0.344 | 6.700 |
| 0.190 | 0.333 | 6.700 |
| 0.182 | 0.322 | 6.700 |
| 0.175 | 0.311 | 6.700 |
| 0.167 | 0.300 | 6.700 |
| 0.159 | 0.290 | 6.700 |
| 0.152 | 0.279 | 6.700 |
| 0.144 | 0.268 | 6.700 |
| 0.136 | 0.258 | 6.700 |
| 0.129 | 0.247 | 6.700 |
| 0.121 | 0.236 | 6.700 |
| 0.113 | 0.226 | 6.700 |
| 0.105 | 0.215 | 6.700 |
| 0.097 | 0.205 | 6.700 |
| 0.089 | 0.195 | 6.700 |
| 0.081 | 0.184 | 6.700 |
| 0.073 | 0.174 | 6.700 |
| 0.064 | 0.164 | 6.700 |
| 0.056 | 0.153 | 6.700 |
| 0.048 | 0.143 | 6.700 |
| 0.039 | 0.133 | 6.700 |
| 0.031 | 0.123 | 6.700 |
| 0.022 | 0.113 | 6.700 |
| 0.013 | 0.104 | 6.700 |
| 0.004 | 0.094 | 6.700 |
| −0.005 | 0.084 | 6.700 |
| −0.014 | 0.075 | 6.700 |
| −0.023 | 0.065 | 6.700 |
| −0.032 | 0.056 | 6.700 |
| −0.042 | 0.047 | 6.700 |
| −0.052 | 0.038 | 6.700 |
| −0.061 | 0.029 | 6.700 |
| −0.071 | 0.020 | 6.700 |
| −0.081 | 0.012 | 6.700 |
| −0.091 | 0.004 | 6.700 |

TABLE 2-continued

|  | X | Y | Z |
|---|---|---|---|
|  | −0.102 | −0.005 | 6.700 |
|  | −0.112 | −0.013 | 6.700 |
|  | −0.123 | −0.020 | 6.700 |
|  | −0.134 | −0.028 | 6.700 |
|  | −0.145 | −0.035 | 6.700 |
|  | −0.156 | −0.042 | 6.700 |
|  | −0.167 | −0.049 | 6.700 |
|  | −0.179 | −0.055 | 6.700 |
|  | −0.190 | −0.061 | 6.700 |
|  | −0.202 | −0.066 | 6.700 |
|  | −0.214 | −0.072 | 6.700 |
|  | −0.227 | −0.076 | 6.700 |
|  | −0.239 | −0.081 | 6.700 |
|  | −0.252 | −0.085 | 6.700 |
|  | −0.264 | −0.088 | 6.700 |
|  | −0.277 | −0.091 | 6.700 |
|  | −0.290 | −0.093 | 6.700 |
|  | −0.303 | −0.095 | 6.700 |
|  | −0.316 | −0.096 | 6.700 |
|  | −0.319 | −0.096 | 6.700 |
|  | −0.321 | −0.097 | 6.700 |
|  | −0.324 | −0.097 | 6.700 |
|  | −0.327 | −0.097 | 6.700 |
|  | −0.329 | −0.097 | 6.700 |
|  | −0.332 | −0.097 | 6.700 |
|  | −0.335 | −0.097 | 6.700 |
|  | −0.337 | −0.097 | 6.700 |
|  | −0.340 | −0.097 | 6.700 |
|  | −0.342 | −0.097 | 6.700 |
|  | −0.353 | −0.097 | 6.700 |
|  | −0.363 | −0.099 | 6.700 |
|  | −0.373 | −0.102 | 6.700 |
|  | −0.383 | −0.105 | 6.700 |
|  | −0.392 | −0.111 | 6.700 |
|  | −0.400 | −0.117 | 6.700 |
|  | −0.407 | −0.124 | 6.700 |
|  | −0.413 | −0.133 | 6.700 |
|  | −0.418 | −0.142 | 6.700 |
|  | −0.420 | −0.152 | 6.700 |
|  | −0.422 | −0.162 | 6.700 |
|  | −0.421 | −0.173 | 6.700 |
|  | −0.419 | −0.183 | 6.700 |
|  | −0.416 | −0.192 | 6.700 |
|  | −0.411 | −0.202 | 6.700 |
|  | −0.405 | −0.210 | 6.700 |
|  | −0.398 | −0.218 | 6.700 |
|  | −0.390 | −0.225 | 6.700 |
| SECTION 9 | −0.372 | −0.210 | 6.854 |
|  | −0.370 | −0.213 | 6.854 |
|  | −0.367 | −0.215 | 6.854 |
|  | −0.365 | −0.217 | 6.854 |
|  | −0.362 | −0.219 | 6.854 |
|  | −0.360 | −0.221 | 6.854 |
|  | −0.357 | −0.222 | 6.854 |
|  | −0.355 | −0.224 | 6.854 |
|  | −0.352 | −0.226 | 6.854 |
|  | −0.349 | −0.228 | 6.854 |
|  | −0.347 | −0.229 | 6.854 |
|  | −0.333 | −0.237 | 6.854 |
|  | −0.318 | −0.244 | 6.854 |
|  | −0.304 | −0.249 | 6.854 |
|  | −0.288 | −0.253 | 6.854 |
|  | −0.273 | −0.256 | 6.854 |
|  | −0.257 | −0.258 | 6.854 |
|  | −0.241 | −0.258 | 6.854 |
|  | −0.225 | −0.258 | 6.854 |
|  | −0.210 | −0.257 | 6.854 |
|  | −0.194 | −0.254 | 6.854 |
|  | −0.179 | −0.251 | 6.854 |
|  | −0.163 | −0.247 | 6.854 |
|  | −0.148 | −0.242 | 6.854 |
|  | −0.133 | −0.236 | 6.854 |
|  | −0.119 | −0.230 | 6.854 |
|  | −0.105 | −0.223 | 6.854 |
|  | −0.091 | −0.215 | 6.854 |
|  | −0.078 | −0.207 | 6.854 |
|  | −0.064 | −0.198 | 6.854 |

TABLE 2-continued

| X | Y | Z |
|---|---|---|
| −0.052 | −0.189 | 6.854 |
| −0.039 | −0.179 | 6.854 |
| −0.027 | −0.169 | 6.854 |
| −0.015 | −0.159 | 6.854 |
| −0.003 | −0.148 | 6.854 |
| 0.008 | −0.137 | 6.854 |
| 0.020 | −0.126 | 6.854 |
| 0.031 | −0.115 | 6.854 |
| 0.041 | −0.103 | 6.854 |
| 0.052 | −0.091 | 6.854 |
| 0.062 | −0.079 | 6.854 |
| 0.072 | −0.067 | 6.854 |
| 0.082 | −0.054 | 6.854 |
| 0.091 | −0.042 | 6.854 |
| 0.100 | −0.029 | 6.854 |
| 0.110 | −0.016 | 6.854 |
| 0.119 | −0.003 | 6.854 |
| 0.127 | 0.010 | 6.854 |
| 0.136 | 0.023 | 6.854 |
| 0.144 | 0.037 | 6.854 |
| 0.153 | 0.050 | 6.854 |
| 0.161 | 0.064 | 6.854 |
| 0.169 | 0.077 | 6.854 |
| 0.176 | 0.091 | 6.854 |
| 0.184 | 0.105 | 6.854 |
| 0.192 | 0.119 | 6.854 |
| 0.199 | 0.133 | 6.854 |
| 0.206 | 0.147 | 6.854 |
| 0.213 | 0.161 | 6.854 |
| 0.220 | 0.175 | 6.854 |
| 0.227 | 0.190 | 6.854 |
| 0.234 | 0.204 | 6.854 |
| 0.241 | 0.218 | 6.854 |
| 0.247 | 0.233 | 6.854 |
| 0.253 | 0.247 | 6.854 |
| 0.260 | 0.262 | 6.854 |
| 0.266 | 0.276 | 6.854 |
| 0.272 | 0.291 | 6.854 |
| 0.278 | 0.306 | 6.854 |
| 0.284 | 0.320 | 6.854 |
| 0.290 | 0.335 | 6.854 |
| 0.295 | 0.350 | 6.854 |
| 0.301 | 0.364 | 6.854 |
| 0.307 | 0.379 | 6.854 |
| 0.312 | 0.394 | 6.854 |
| 0.317 | 0.409 | 6.854 |
| 0.323 | 0.424 | 6.854 |
| 0.328 | 0.439 | 6.854 |
| 0.333 | 0.454 | 6.854 |
| 0.338 | 0.469 | 6.854 |
| 0.343 | 0.484 | 6.854 |
| 0.348 | 0.499 | 6.854 |
| 0.353 | 0.514 | 6.854 |
| 0.358 | 0.529 | 6.854 |
| 0.363 | 0.544 | 6.854 |
| 0.368 | 0.559 | 6.854 |
| 0.372 | 0.574 | 6.854 |
| 0.377 | 0.589 | 6.854 |
| 0.382 | 0.604 | 6.854 |
| 0.387 | 0.619 | 6.854 |
| 0.387 | 0.622 | 6.854 |
| 0.388 | 0.625 | 6.854 |
| 0.389 | 0.628 | 6.854 |
| 0.390 | 0.631 | 6.854 |
| 0.391 | 0.634 | 6.854 |
| 0.392 | 0.638 | 6.854 |
| 0.393 | 0.641 | 6.854 |
| 0.394 | 0.644 | 6.854 |
| 0.395 | 0.647 | 6.854 |
| 0.396 | 0.650 | 6.854 |
| 0.396 | 0.651 | 6.854 |
| 0.396 | 0.653 | 6.854 |
| 0.396 | 0.655 | 6.854 |
| 0.396 | 0.657 | 6.854 |
| 0.395 | 0.658 | 6.854 |
| 0.394 | 0.660 | 6.854 |
| 0.393 | 0.661 | 6.854 |

TABLE 2-continued

| X | Y | Z |
|---|---|---|
| 0.392 | 0.662 | 6.854 |
| 0.390 | 0.663 | 6.854 |
| 0.389 | 0.664 | 6.854 |
| 0.387 | 0.664 | 6.854 |
| 0.385 | 0.664 | 6.854 |
| 0.383 | 0.664 | 6.854 |
| 0.382 | 0.664 | 6.854 |
| 0.380 | 0.664 | 6.854 |
| 0.379 | 0.663 | 6.854 |
| 0.377 | 0.662 | 6.854 |
| 0.376 | 0.660 | 6.854 |
| 0.375 | 0.659 | 6.854 |
| 0.373 | 0.657 | 6.854 |
| 0.372 | 0.655 | 6.854 |
| 0.371 | 0.653 | 6.854 |
| 0.369 | 0.650 | 6.854 |
| 0.368 | 0.648 | 6.854 |
| 0.367 | 0.646 | 6.854 |
| 0.365 | 0.644 | 6.854 |
| 0.364 | 0.642 | 6.854 |
| 0.363 | 0.640 | 6.854 |
| 0.361 | 0.638 | 6.854 |
| 0.354 | 0.627 | 6.854 |
| 0.348 | 0.616 | 6.854 |
| 0.341 | 0.605 | 6.854 |
| 0.334 | 0.595 | 6.854 |
| 0.327 | 0.584 | 6.854 |
| 0.320 | 0.573 | 6.854 |
| 0.314 | 0.562 | 6.854 |
| 0.307 | 0.551 | 6.854 |
| 0.300 | 0.541 | 6.854 |
| 0.293 | 0.530 | 6.854 |
| 0.286 | 0.519 | 6.854 |
| 0.280 | 0.508 | 6.854 |
| 0.273 | 0.498 | 6.854 |
| 0.266 | 0.487 | 6.854 |
| 0.259 | 0.476 | 6.854 |
| 0.252 | 0.466 | 6.854 |
| 0.245 | 0.455 | 6.854 |
| 0.239 | 0.444 | 6.854 |
| 0.232 | 0.433 | 6.854 |
| 0.225 | 0.423 | 6.854 |
| 0.218 | 0.412 | 6.854 |
| 0.211 | 0.401 | 6.854 |
| 0.204 | 0.391 | 6.854 |
| 0.197 | 0.380 | 6.854 |
| 0.190 | 0.369 | 6.854 |
| 0.183 | 0.359 | 6.854 |
| 0.176 | 0.348 | 6.854 |
| 0.169 | 0.338 | 6.854 |
| 0.162 | 0.327 | 6.854 |
| 0.155 | 0.316 | 6.854 |
| 0.148 | 0.306 | 6.854 |
| 0.140 | 0.295 | 6.854 |
| 0.133 | 0.285 | 6.854 |
| 0.126 | 0.275 | 6.854 |
| 0.119 | 0.264 | 6.854 |
| 0.111 | 0.254 | 6.854 |
| 0.104 | 0.243 | 6.854 |
| 0.096 | 0.233 | 6.854 |
| 0.089 | 0.223 | 6.854 |
| 0.081 | 0.213 | 6.854 |
| 0.074 | 0.202 | 6.854 |
| 0.066 | 0.192 | 6.854 |
| 0.058 | 0.182 | 6.854 |
| 0.051 | 0.172 | 6.854 |
| 0.043 | 0.162 | 6.854 |
| 0.035 | 0.152 | 6.854 |
| 0.027 | 0.142 | 6.854 |
| 0.019 | 0.132 | 6.854 |
| 0.010 | 0.123 | 6.854 |
| 0.002 | 0.113 | 6.854 |
| −0.006 | 0.103 | 6.854 |
| −0.015 | 0.094 | 6.854 |
| −0.023 | 0.085 | 6.854 |
| −0.032 | 0.075 | 6.854 |
| −0.041 | 0.066 | 6.854 |

TABLE 2-continued

| | X | Y | Z |
|---|---|---|---|
| | −0.050 | 0.057 | 6.854 |
| | −0.059 | 0.048 | 6.854 |
| | −0.068 | 0.039 | 6.854 |
| | −0.078 | 0.031 | 6.854 |
| | −0.087 | 0.022 | 6.854 |
| | −0.097 | 0.014 | 6.854 |
| | −0.106 | 0.006 | 6.854 |
| | −0.116 | −0.002 | 6.854 |
| | −0.126 | −0.010 | 6.854 |
| | −0.137 | −0.017 | 6.854 |
| | −0.147 | −0.025 | 6.854 |
| | −0.158 | −0.032 | 6.854 |
| | −0.169 | −0.038 | 6.854 |
| | −0.180 | −0.045 | 6.854 |
| | −0.191 | −0.051 | 6.854 |
| | −0.202 | −0.056 | 6.854 |
| | −0.214 | −0.061 | 6.854 |
| | −0.226 | −0.066 | 6.854 |
| | −0.238 | −0.070 | 6.854 |
| | −0.250 | −0.074 | 6.854 |
| | −0.262 | −0.077 | 6.854 |
| | −0.275 | −0.080 | 6.854 |
| | −0.287 | −0.082 | 6.854 |
| | −0.300 | −0.083 | 6.854 |
| | −0.302 | −0.084 | 6.854 |
| | −0.305 | −0.084 | 6.854 |
| | −0.307 | −0.084 | 6.854 |
| | −0.310 | −0.084 | 6.854 |
| | −0.313 | −0.084 | 6.854 |
| | −0.315 | −0.084 | 6.854 |
| | −0.318 | −0.084 | 6.854 |
| | −0.320 | −0.084 | 6.854 |
| | −0.323 | −0.084 | 6.854 |
| | −0.325 | −0.084 | 6.854 |
| | −0.335 | −0.085 | 6.854 |
| | −0.344 | −0.086 | 6.854 |
| | −0.353 | −0.088 | 6.854 |
| | −0.362 | −0.092 | 6.854 |
| | −0.370 | −0.097 | 6.854 |
| | −0.378 | −0.102 | 6.854 |
| | −0.385 | −0.109 | 6.854 |
| | −0.390 | −0.116 | 6.854 |
| | −0.395 | −0.125 | 6.854 |
| | −0.398 | −0.134 | 6.854 |
| | −0.400 | −0.143 | 6.854 |
| | −0.400 | −0.152 | 6.854 |
| | −0.399 | −0.162 | 6.854 |
| | −0.397 | −0.171 | 6.854 |
| | −0.394 | −0.180 | 6.854 |
| | −0.390 | −0.189 | 6.854 |
| | −0.385 | −0.196 | 6.854 |
| | −0.379 | −0.204 | 6.854 |
| SECTION 10 | −0.358 | −0.179 | 7.054 |
| | −0.356 | −0.181 | 7.054 |
| | −0.355 | −0.184 | 7.054 |
| | −0.353 | −0.187 | 7.054 |
| | −0.351 | −0.189 | 7.054 |
| | −0.349 | −0.191 | 7.054 |
| | −0.347 | −0.194 | 7.054 |
| | −0.345 | −0.196 | 7.054 |
| | −0.343 | −0.198 | 7.054 |
| | −0.340 | −0.201 | 7.054 |
| | −0.338 | −0.203 | 7.054 |
| | −0.326 | −0.213 | 7.054 |
| | −0.314 | −0.222 | 7.054 |
| | −0.300 | −0.230 | 7.054 |
| | −0.286 | −0.237 | 7.054 |
| | −0.271 | −0.242 | 7.054 |
| | −0.256 | −0.246 | 7.054 |
| | −0.240 | −0.249 | 7.054 |
| | −0.225 | −0.250 | 7.054 |
| | −0.209 | −0.250 | 7.054 |
| | −0.193 | −0.249 | 7.054 |
| | −0.178 | −0.247 | 7.054 |
| | −0.162 | −0.244 | 7.054 |
| | −0.147 | −0.240 | 7.054 |
| | −0.132 | −0.235 | 7.054 |

TABLE 2-continued

| X | Y | Z |
|---|---|---|
| −0.118 | −0.230 | 7.054 |
| −0.103 | −0.223 | 7.054 |
| −0.089 | −0.216 | 7.054 |
| −0.076 | −0.208 | 7.054 |
| −0.063 | −0.200 | 7.054 |
| −0.050 | −0.191 | 7.054 |
| −0.037 | −0.181 | 7.054 |
| −0.025 | −0.171 | 7.054 |
| −0.013 | −0.161 | 7.054 |
| −0.002 | −0.150 | 7.054 |
| 0.010 | −0.139 | 7.054 |
| 0.021 | −0.128 | 7.054 |
| 0.031 | −0.117 | 7.054 |
| 0.042 | −0.105 | 7.054 |
| 0.052 | −0.093 | 7.054 |
| 0.061 | −0.081 | 7.054 |
| 0.071 | −0.068 | 7.054 |
| 0.080 | −0.055 | 7.054 |
| 0.089 | −0.043 | 7.054 |
| 0.098 | −0.030 | 7.054 |
| 0.107 | −0.016 | 7.054 |
| 0.115 | −0.003 | 7.054 |
| 0.123 | 0.010 | 7.054 |
| 0.131 | 0.024 | 7.054 |
| 0.139 | 0.038 | 7.054 |
| 0.146 | 0.051 | 7.054 |
| 0.154 | 0.065 | 7.054 |
| 0.161 | 0.079 | 7.054 |
| 0.168 | 0.093 | 7.054 |
| 0.175 | 0.107 | 7.054 |
| 0.181 | 0.122 | 7.054 |
| 0.188 | 0.136 | 7.054 |
| 0.194 | 0.150 | 7.054 |
| 0.201 | 0.165 | 7.054 |
| 0.207 | 0.179 | 7.054 |
| 0.213 | 0.194 | 7.054 |
| 0.219 | 0.208 | 7.054 |
| 0.224 | 0.223 | 7.054 |
| 0.230 | 0.237 | 7.054 |
| 0.235 | 0.252 | 7.054 |
| 0.241 | 0.267 | 7.054 |
| 0.246 | 0.282 | 7.054 |
| 0.251 | 0.296 | 7.054 |
| 0.257 | 0.311 | 7.054 |
| 0.262 | 0.326 | 7.054 |
| 0.267 | 0.341 | 7.054 |
| 0.271 | 0.356 | 7.054 |
| 0.276 | 0.371 | 7.054 |
| 0.281 | 0.386 | 7.054 |
| 0.286 | 0.401 | 7.054 |
| 0.290 | 0.416 | 7.054 |
| 0.295 | 0.431 | 7.054 |
| 0.299 | 0.446 | 7.054 |
| 0.304 | 0.461 | 7.054 |
| 0.308 | 0.476 | 7.054 |
| 0.313 | 0.491 | 7.054 |
| 0.317 | 0.506 | 7.054 |
| 0.321 | 0.521 | 7.054 |
| 0.326 | 0.536 | 7.054 |
| 0.330 | 0.551 | 7.054 |
| 0.334 | 0.566 | 7.054 |
| 0.339 | 0.582 | 7.054 |
| 0.343 | 0.597 | 7.054 |
| 0.347 | 0.612 | 7.054 |
| 0.351 | 0.627 | 7.054 |
| 0.352 | 0.630 | 7.054 |
| 0.353 | 0.633 | 7.054 |
| 0.354 | 0.636 | 7.054 |
| 0.355 | 0.639 | 7.054 |
| 0.356 | 0.642 | 7.054 |
| 0.357 | 0.645 | 7.054 |
| 0.358 | 0.648 | 7.054 |
| 0.358 | 0.651 | 7.054 |
| 0.359 | 0.654 | 7.054 |
| 0.360 | 0.657 | 7.054 |
| 0.361 | 0.659 | 7.054 |
| 0.361 | 0.660 | 7.054 |
| 0.360 | 0.662 | 7.054 |
| 0.360 | 0.664 | 7.054 |
| 0.359 | 0.666 | 7.054 |
| 0.358 | 0.667 | 7.054 |
| 0.357 | 0.668 | 7.054 |
| 0.356 | 0.669 | 7.054 |
| 0.354 | 0.670 | 7.054 |
| 0.353 | 0.671 | 7.054 |
| 0.351 | 0.671 | 7.054 |
| 0.349 | 0.672 | 7.054 |
| 0.347 | 0.672 | 7.054 |
| 0.346 | 0.671 | 7.054 |
| 0.344 | 0.671 | 7.054 |
| 0.342 | 0.670 | 7.054 |
| 0.341 | 0.669 | 7.054 |
| 0.340 | 0.667 | 7.054 |
| 0.339 | 0.666 | 7.054 |
| 0.338 | 0.664 | 7.054 |
| 0.336 | 0.662 | 7.054 |
| 0.335 | 0.660 | 7.054 |
| 0.334 | 0.658 | 7.054 |
| 0.333 | 0.656 | 7.054 |
| 0.331 | 0.654 | 7.054 |
| 0.330 | 0.652 | 7.054 |
| 0.329 | 0.650 | 7.054 |
| 0.328 | 0.647 | 7.054 |
| 0.326 | 0.645 | 7.054 |
| 0.320 | 0.635 | 7.054 |
| 0.314 | 0.625 | 7.054 |
| 0.308 | 0.614 | 7.054 |
| 0.301 | 0.604 | 7.054 |
| 0.295 | 0.594 | 7.054 |
| 0.289 | 0.584 | 7.054 |
| 0.283 | 0.573 | 7.054 |
| 0.276 | 0.563 | 7.054 |
| 0.270 | 0.553 | 7.054 |
| 0.264 | 0.542 | 7.054 |
| 0.258 | 0.532 | 7.054 |
| 0.251 | 0.522 | 7.054 |
| 0.245 | 0.511 | 7.054 |
| 0.239 | 0.501 | 7.054 |
| 0.233 | 0.491 | 7.054 |
| 0.226 | 0.480 | 7.054 |
| 0.220 | 0.470 | 7.054 |
| 0.214 | 0.460 | 7.054 |
| 0.207 | 0.450 | 7.054 |
| 0.201 | 0.439 | 7.054 |
| 0.195 | 0.429 | 7.054 |
| 0.188 | 0.419 | 7.054 |
| 0.182 | 0.408 | 7.054 |
| 0.176 | 0.398 | 7.054 |
| 0.169 | 0.388 | 7.054 |
| 0.163 | 0.378 | 7.054 |
| 0.156 | 0.368 | 7.054 |
| 0.150 | 0.357 | 7.054 |
| 0.143 | 0.347 | 7.054 |
| 0.137 | 0.337 | 7.054 |
| 0.130 | 0.327 | 7.054 |
| 0.124 | 0.317 | 7.054 |
| 0.117 | 0.307 | 7.054 |
| 0.111 | 0.297 | 7.054 |
| 0.104 | 0.287 | 7.054 |
| 0.097 | 0.277 | 7.054 |
| 0.091 | 0.267 | 7.054 |
| 0.084 | 0.257 | 7.054 |
| 0.077 | 0.247 | 7.054 |
| 0.070 | 0.237 | 7.054 |
| 0.063 | 0.227 | 7.054 |
| 0.056 | 0.217 | 7.054 |
| 0.049 | 0.207 | 7.054 |
| 0.042 | 0.197 | 7.054 |
| 0.035 | 0.188 | 7.054 |
| 0.028 | 0.178 | 7.054 |
| 0.021 | 0.168 | 7.054 |
| 0.013 | 0.159 | 7.054 |
| 0.006 | 0.149 | 7.054 |
| −0.002 | 0.140 | 7.054 |

TABLE 2-continued

| | X | Y | Z |
|---|---|---|---|
| | −0.009 | 0.130 | 7.054 |
| | −0.017 | 0.121 | 7.054 |
| | −0.025 | 0.112 | 7.054 |
| | −0.032 | 0.103 | 7.054 |
| | −0.040 | 0.093 | 7.054 |
| | −0.048 | 0.084 | 7.054 |
| | −0.056 | 0.076 | 7.054 |
| | −0.065 | 0.067 | 7.054 |
| | −0.073 | 0.058 | 7.054 |
| | −0.081 | 0.049 | 7.054 |
| | −0.090 | 0.041 | 7.054 |
| | −0.099 | 0.033 | 7.054 |
| | −0.108 | 0.025 | 7.054 |
| | −0.117 | 0.017 | 7.054 |
| | −0.126 | 0.009 | 7.054 |
| | −0.135 | 0.001 | 7.054 |
| | −0.145 | −0.006 | 7.054 |
| | −0.155 | −0.013 | 7.054 |
| | −0.165 | −0.020 | 7.054 |
| | −0.175 | −0.026 | 7.054 |
| | −0.185 | −0.033 | 7.054 |
| | −0.196 | −0.038 | 7.054 |
| | −0.207 | −0.043 | 7.054 |
| | −0.218 | −0.048 | 7.054 |
| | −0.229 | −0.053 | 7.054 |
| | −0.241 | −0.056 | 7.054 |
| | −0.252 | −0.059 | 7.054 |
| | −0.264 | −0.062 | 7.054 |
| | −0.276 | −0.064 | 7.054 |
| | −0.278 | −0.064 | 7.054 |
| | −0.281 | −0.064 | 7.054 |
| | −0.283 | −0.064 | 7.054 |
| | −0.286 | −0.064 | 7.054 |
| | −0.288 | −0.065 | 7.054 |
| | −0.290 | −0.065 | 7.054 |
| | −0.293 | −0.065 | 7.054 |
| | −0.295 | −0.065 | 7.054 |
| | −0.298 | −0.065 | 7.054 |
| | −0.300 | −0.065 | 7.054 |
| | −0.308 | −0.065 | 7.054 |
| | −0.317 | −0.066 | 7.054 |
| | −0.325 | −0.069 | 7.054 |
| | −0.332 | −0.072 | 7.054 |
| | −0.340 | −0.075 | 7.054 |
| | −0.347 | −0.080 | 7.054 |
| | −0.353 | −0.086 | 7.054 |
| | −0.358 | −0.092 | 7.054 |
| | −0.362 | −0.099 | 7.054 |
| | −0.366 | −0.107 | 7.054 |
| | −0.368 | −0.115 | 7.054 |
| | −0.370 | −0.123 | 7.054 |
| | −0.371 | −0.131 | 7.054 |
| | −0.371 | −0.140 | 7.054 |
| | −0.370 | −0.148 | 7.054 |
| | −0.368 | −0.156 | 7.054 |
| | −0.366 | −0.164 | 7.054 |
| | −0.362 | −0.172 | 7.054 |
| SECTION 11 | −0.344 | −0.143 | 7.254 |
| | −0.343 | −0.146 | 7.254 |
| | −0.342 | −0.149 | 7.254 |
| | −0.341 | −0.152 | 7.254 |
| | −0.339 | −0.155 | 7.254 |
| | −0.338 | −0.157 | 7.254 |
| | −0.337 | −0.160 | 7.254 |
| | −0.335 | −0.163 | 7.254 |
| | −0.334 | −0.166 | 7.254 |
| | −0.332 | −0.168 | 7.254 |
| | −0.330 | −0.171 | 7.254 |
| | −0.321 | −0.184 | 7.254 |
| | −0.311 | −0.196 | 7.254 |
| | −0.300 | −0.206 | 7.254 |
| | −0.287 | −0.216 | 7.254 |
| | −0.274 | −0.224 | 7.254 |
| | −0.260 | −0.231 | 7.254 |
| | −0.245 | −0.236 | 7.254 |
| | −0.230 | −0.240 | 7.254 |
| | −0.214 | −0.243 | 7.254 |

TABLE 2-continued

| X | Y | Z |
|---|---|---|
| −0.199 | −0.244 | 7.254 |
| −0.183 | −0.244 | 7.254 |
| −0.168 | −0.242 | 7.254 |
| −0.152 | −0.240 | 7.254 |
| −0.137 | −0.236 | 7.254 |
| −0.122 | −0.232 | 7.254 |
| −0.107 | −0.226 | 7.254 |
| −0.093 | −0.220 | 7.254 |
| −0.079 | −0.213 | 7.254 |
| −0.066 | −0.205 | 7.254 |
| −0.053 | −0.196 | 7.254 |
| −0.040 | −0.187 | 7.254 |
| −0.027 | −0.178 | 7.254 |
| −0.016 | −0.168 | 7.254 |
| −0.004 | −0.157 | 7.254 |
| 0.007 | −0.146 | 7.254 |
| 0.018 | −0.135 | 7.254 |
| 0.029 | −0.123 | 7.254 |
| 0.039 | −0.111 | 7.254 |
| 0.049 | −0.099 | 7.254 |
| 0.058 | −0.087 | 7.254 |
| 0.067 | −0.074 | 7.254 |
| 0.076 | −0.061 | 7.254 |
| 0.085 | −0.048 | 7.254 |
| 0.093 | −0.035 | 7.254 |
| 0.101 | −0.021 | 7.254 |
| 0.109 | −0.008 | 7.254 |
| 0.116 | 0.006 | 7.254 |
| 0.124 | 0.020 | 7.254 |
| 0.131 | 0.034 | 7.254 |
| 0.137 | 0.048 | 7.254 |
| 0.144 | 0.062 | 7.254 |
| 0.150 | 0.076 | 7.254 |
| 0.157 | 0.091 | 7.254 |
| 0.163 | 0.105 | 7.254 |
| 0.169 | 0.119 | 7.254 |
| 0.174 | 0.134 | 7.254 |
| 0.180 | 0.149 | 7.254 |
| 0.185 | 0.163 | 7.254 |
| 0.190 | 0.178 | 7.254 |
| 0.195 | 0.193 | 7.254 |
| 0.200 | 0.208 | 7.254 |
| 0.205 | 0.223 | 7.254 |
| 0.210 | 0.238 | 7.254 |
| 0.214 | 0.252 | 7.254 |
| 0.219 | 0.267 | 7.254 |
| 0.223 | 0.282 | 7.254 |
| 0.228 | 0.297 | 7.254 |
| 0.232 | 0.313 | 7.254 |
| 0.236 | 0.328 | 7.254 |
| 0.240 | 0.343 | 7.254 |
| 0.244 | 0.358 | 7.254 |
| 0.248 | 0.373 | 7.254 |
| 0.252 | 0.388 | 7.254 |
| 0.256 | 0.403 | 7.254 |
| 0.260 | 0.418 | 7.254 |
| 0.264 | 0.434 | 7.254 |
| 0.267 | 0.449 | 7.254 |
| 0.271 | 0.464 | 7.254 |
| 0.275 | 0.479 | 7.254 |
| 0.279 | 0.494 | 7.254 |
| 0.282 | 0.510 | 7.254 |
| 0.286 | 0.525 | 7.254 |
| 0.290 | 0.540 | 7.254 |
| 0.294 | 0.555 | 7.254 |
| 0.297 | 0.570 | 7.254 |
| 0.301 | 0.585 | 7.254 |
| 0.305 | 0.601 | 7.254 |
| 0.309 | 0.616 | 7.254 |
| 0.313 | 0.631 | 7.254 |
| 0.314 | 0.634 | 7.254 |
| 0.314 | 0.637 | 7.254 |
| 0.315 | 0.640 | 7.254 |
| 0.316 | 0.643 | 7.254 |
| 0.317 | 0.646 | 7.254 |
| 0.318 | 0.649 | 7.254 |
| 0.318 | 0.652 | 7.254 |

TABLE 2-continued

| X | Y | Z |
|---|---|---|
| 0.319 | 0.655 | 7.254 |
| 0.320 | 0.658 | 7.254 |
| 0.321 | 0.661 | 7.254 |
| 0.321 | 0.663 | 7.254 |
| 0.321 | 0.665 | 7.254 |
| 0.321 | 0.666 | 7.254 |
| 0.320 | 0.668 | 7.254 |
| 0.320 | 0.670 | 7.254 |
| 0.319 | 0.671 | 7.254 |
| 0.317 | 0.672 | 7.254 |
| 0.316 | 0.674 | 7.254 |
| 0.315 | 0.674 | 7.254 |
| 0.313 | 0.675 | 7.254 |
| 0.311 | 0.675 | 7.254 |
| 0.309 | 0.676 | 7.254 |
| 0.308 | 0.675 | 7.254 |
| 0.306 | 0.675 | 7.254 |
| 0.304 | 0.674 | 7.254 |
| 0.303 | 0.674 | 7.254 |
| 0.301 | 0.672 | 7.254 |
| 0.300 | 0.671 | 7.254 |
| 0.299 | 0.670 | 7.254 |
| 0.298 | 0.668 | 7.254 |
| 0.297 | 0.666 | 7.254 |
| 0.296 | 0.664 | 7.254 |
| 0.295 | 0.662 | 7.254 |
| 0.294 | 0.660 | 7.254 |
| 0.292 | 0.658 | 7.254 |
| 0.291 | 0.656 | 7.254 |
| 0.290 | 0.654 | 7.254 |
| 0.289 | 0.652 | 7.254 |
| 0.288 | 0.650 | 7.254 |
| 0.282 | 0.640 | 7.254 |
| 0.277 | 0.631 | 7.254 |
| 0.271 | 0.621 | 7.254 |
| 0.265 | 0.611 | 7.254 |
| 0.260 | 0.601 | 7.254 |
| 0.254 | 0.591 | 7.254 |
| 0.248 | 0.582 | 7.254 |
| 0.243 | 0.572 | 7.254 |
| 0.237 | 0.562 | 7.254 |
| 0.231 | 0.552 | 7.254 |
| 0.226 | 0.542 | 7.254 |
| 0.220 | 0.533 | 7.254 |
| 0.214 | 0.523 | 7.254 |
| 0.209 | 0.513 | 7.254 |
| 0.203 | 0.503 | 7.254 |
| 0.197 | 0.493 | 7.254 |
| 0.192 | 0.484 | 7.254 |
| 0.186 | 0.474 | 7.254 |
| 0.180 | 0.464 | 7.254 |
| 0.175 | 0.454 | 7.254 |
| 0.169 | 0.445 | 7.254 |
| 0.163 | 0.435 | 7.254 |
| 0.158 | 0.425 | 7.254 |
| 0.152 | 0.415 | 7.254 |
| 0.146 | 0.406 | 7.254 |
| 0.140 | 0.396 | 7.254 |
| 0.134 | 0.386 | 7.254 |
| 0.129 | 0.376 | 7.254 |
| 0.123 | 0.367 | 7.254 |
| 0.117 | 0.357 | 7.254 |
| 0.111 | 0.347 | 7.254 |
| 0.105 | 0.338 | 7.254 |
| 0.099 | 0.328 | 7.254 |
| 0.093 | 0.318 | 7.254 |
| 0.087 | 0.309 | 7.254 |
| 0.081 | 0.299 | 7.254 |
| 0.075 | 0.290 | 7.254 |
| 0.069 | 0.280 | 7.254 |
| 0.063 | 0.271 | 7.254 |
| 0.057 | 0.261 | 7.254 |
| 0.051 | 0.252 | 7.254 |
| 0.045 | 0.242 | 7.254 |
| 0.039 | 0.233 | 7.254 |
| 0.032 | 0.223 | 7.254 |
| 0.026 | 0.214 | 7.254 |
| 0.020 | 0.205 | 7.254 |
| 0.013 | 0.195 | 7.254 |
| 0.007 | 0.186 | 7.254 |
| 0.000 | 0.177 | 7.254 |
| −0.007 | 0.168 | 7.254 |
| −0.013 | 0.158 | 7.254 |
| −0.020 | 0.149 | 7.254 |
| −0.027 | 0.140 | 7.254 |
| −0.034 | 0.131 | 7.254 |
| −0.041 | 0.122 | 7.254 |
| −0.048 | 0.114 | 7.254 |
| −0.055 | 0.105 | 7.254 |
| −0.062 | 0.096 | 7.254 |
| −0.069 | 0.087 | 7.254 |
| −0.077 | 0.079 | 7.254 |
| −0.084 | 0.070 | 7.254 |
| −0.092 | 0.062 | 7.254 |
| −0.099 | 0.054 | 7.254 |
| −0.107 | 0.046 | 7.254 |
| −0.115 | 0.038 | 7.254 |
| −0.124 | 0.030 | 7.254 |
| −0.132 | 0.022 | 7.254 |
| −0.140 | 0.015 | 7.254 |
| −0.149 | 0.008 | 7.254 |
| −0.158 | 0.001 | 7.254 |
| −0.167 | −0.006 | 7.254 |
| −0.177 | −0.012 | 7.254 |
| −0.187 | −0.018 | 7.254 |
| −0.197 | −0.023 | 7.254 |
| −0.207 | −0.028 | 7.254 |
| −0.217 | −0.032 | 7.254 |
| −0.228 | −0.036 | 7.254 |
| −0.239 | −0.039 | 7.254 |
| −0.250 | −0.041 | 7.254 |
| −0.252 | −0.041 | 7.254 |
| −0.255 | −0.041 | 7.254 |
| −0.257 | −0.042 | 7.254 |
| −0.259 | −0.042 | 7.254 |
| −0.261 | −0.042 | 7.254 |
| −0.264 | −0.042 | 7.254 |
| −0.266 | −0.043 | 7.254 |
| −0.268 | −0.043 | 7.254 |
| −0.270 | −0.043 | 7.254 |
| −0.273 | −0.043 | 7.254 |
| −0.280 | −0.043 | 7.254 |
| −0.287 | −0.044 | 7.254 |
| −0.294 | −0.046 | 7.254 |
| −0.301 | −0.049 | 7.254 |
| −0.308 | −0.052 | 7.254 |
| −0.314 | −0.057 | 7.254 |
| −0.319 | −0.062 | 7.254 |
| −0.324 | −0.067 | 7.254 |
| −0.329 | −0.073 | 7.254 |
| −0.333 | −0.079 | 7.254 |
| −0.336 | −0.085 | 7.254 |
| −0.339 | −0.092 | 7.254 |
| −0.342 | −0.099 | 7.254 |
| −0.344 | −0.106 | 7.254 |
| −0.345 | −0.114 | 7.254 |
| −0.345 | −0.121 | 7.254 |
| −0.345 | −0.128 | 7.254 |
| −0.345 | −0.136 | 7.254 |

It should be understood that the finished HPT vane 40b does not include all the sections defined in Table 2. The portion of the airfoil 54 proximal to the platforms 60 and 62 may not be defined by a profile section 66. It should be considered that the vane 40b airfoil profile proximal to the platforms 60 and 62 may vary due to several imposed constraints. However the HPT vane 40b has an intermediate airfoil portion 64 defined between the inner and outer vane platforms 60 and 62 thereof and which has a profile defined on the basis of at least the intermediate Sections of the various vane profile sections 66 defined in Table 2.

It should be appreciated that the intermediate airfoil portion 64 of the second HPT stage vane 40b is defined between the inner and outer gaspath walls 28 and 30 which are partially defined by the inner and outer vane platforms 60 and 62. More specifically, the Z values defining the gaspath in the region of the stacking line 48 fall within the range of Z=5.784 and Z=7.08 which are the z values at the stacking line 48 (see Table 1). Therefore, the airfoil profile physically appearing on HPT vane 40b includes Sections 3 to 9 of Table 2. Sections 2 and 10 are only partially included in the gaspath. Sections 1 and 11 are located completely outside of the boundaries set by the inner and annular outer gaspath walls 28 and 30 at the second stage HPT vane stacking line, but are provided, in part, to fully define the airfoil surface and, in part, to improve curve-fitting of the airfoil at its radially distal portions. The skilled reader will appreciate that a suitable fillet radius is to be applied between the platforms 60 and 62 and the airfoil portion of the vane.

The above description is meant to be exemplary only, and one skilled in the art will recognize that changes may be made to the embodiments described without department from the scope of the invention disclosed. For example, the airfoil and/or gaspath definitions of Tables 1 and 2 may be scaled geometrically, while maintaining the same proportional relationship and airfoil shape, for application to gas turbine engine of other sizes. Still other modifications which fall within the scope of the present invention will be apparent to those skilled in the art, in light of a review of this disclosure, and such modifications are intended to fall within the appended claims.

The invention claimed is:

1. A turbine vane for a gas turbine engine comprising an airfoil having an intermediate portion defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z.

2. The turbine vane as defined in claim 1 forming part of a high pressure turbine stage of the gas turbine engine.

3. The turbine vane as defined in claim 2, wherein the vane forms part of a second stage of a two-stage high pressure turbine.

4. The turbine vane as defined in claim 1, wherein the X and Y values are scalable as a function of the same constant or number.

5. The turbine vane as defined in claim 1, wherein the X and Y coordinate values have a manufacturing tolerance of ±0.003 inch.

6. The turbine vane as defined in claim 5, wherein the nominal profile defining the intermediate portion is for an uncoated airfoil, and wherein a coating having a thickness of 0.001 to 0.002 inch is applied to the airfoil.

7. The turbine vane as defined in claim 1, wherein X and Y values define a set of points for each Z value which when connected by smooth continuing arcs define an airfoil profile section, the profile sections at the Z distances being joined smoothly with one another to form an airfoil shape of the intermediate portion.

8. A turbine vane for a gas turbine engine, the turbine vane having an uncoated intermediate airfoil portion defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z, and wherein the X and Y values are scalable as a function of the same constant or number.

9. The turbine vane as defined in claim 8 forming part of a vane of a high pressure turbine stage of the gas turbine engine.

10. The turbine vane as defined in claim 9, wherein the vane is part of a second stage of a two-stage stage high pressure turbine.

11. The turbine vane as defined in claim 8, wherein the X, and Y coordinate values have a manufacturing tolerance of ±0.003 inch.

12. The turbine vane as defined in claim 11, wherein a coating having a thickness of 0.001 to 0.002 inch is applied to the vane.

13. The turbine vane as defined in claim 8, wherein X and Y values define a set of points for each Z value which when connected by smooth continuing arcs define an airfoil profile section, the profile sections at the Z distances being joined smoothly with one another to form an airfoil shape of the intermediate portion.

14. A turbine stator assembly for a gas turbine engine comprising a plurality of vanes, each vanes including an airfoil having an intermediate portion defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine vane, the Z values are radial distances measured along the stacking line, the X and Y are coordinate values defining the profile at each distance Z.

15. A high pressure turbine vane comprising at least one airfoil having a surface lying substantially on the points of Table 2, the airfoil extending between platforms defined generally by Table 1, wherein a fillet radius is applied around the airfoil between the airfoil and platforms, and wherein the values of Table 2 are subject to the relevant tolerance.

* * * * *